United States Patent
Howell et al.

(10) Patent No.: US 7,543,934 B2
(45) Date of Patent: Jun. 9, 2009

(54) EYEGLASSES WITH ACTIVITY MONITORING AND ACOUSTIC DAMPENING

(75) Inventors: Thomas A. Howell, Palo Alto, CA (US); David Chao, Saratoga, CA (US); Yeou-Soon Lee, Chlayi (TW); C. Douglass Thomas, Campbell, CA (US); Peter P. Tong, Mountain View, CA (US)

(73) Assignee: IpVentures, Inc., Los Altos, CA (US)

( * ) Notice: Subject to any disclaimer, the term of this patent is extended or adjusted under 35 U.S.C. 154(b) by 81 days.

(21) Appl. No.: 11/903,512

(22) Filed: Sep. 20, 2007

(65) Prior Publication Data
US 2008/0068559 A1 Mar. 20, 2008

Related U.S. Application Data

(60) Provisional application No. 60/846,150, filed on Sep. 20, 2006.

(51) Int. Cl.
*G02C 1/00* (2006.01)
(52) U.S. Cl. .......................... 351/158; 702/160
(58) Field of Classification Search ................ 351/41, 351/158; 377/24.2; 702/160
See application file for complete search history.

(56) References Cited

U.S. PATENT DOCUMENTS

| | | |
|---|---|---|
| 320,558 A | 6/1885 | Hull |
| 669,949 A | 3/1901 | Underwood |
| 1,255,265 A | 2/1918 | Zachara |
| 1,917,745 A | 7/1933 | Weiss |
| 2,638,532 A | 5/1953 | Brady |
| 2,904,670 A | 9/1959 | Calmes |
| 3,060,308 A | 10/1962 | Fortuna |
| 3,597,054 A | 8/1971 | Winter |
| 3,710,115 A | 1/1973 | Jubb |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |

(Continued)

FOREIGN PATENT DOCUMENTS

CN 88203065 11/1988

(Continued)

OTHER PUBLICATIONS

"±1.5g Dual Axis Micromachined Accelerometer", Freescale Semiconductor, Inc., Motorola Semiconductor Technical Data, MMA6260Q, 2004, pp. 1-7.

(Continued)

*Primary Examiner*—Huy K Mai

(57) ABSTRACT

In one embodiment, eyewear having an activity monitoring capability is disclosed. Activity, such as motion, steps or distance, can be measured by an activity detector. The measured activity can then be used in providing activity-related information to a user of the eyewear. Advantageously, the user of the eyewear is able to easily monitor their degree of activity. For quieter operation, acoustic dampening can be employed. In other embodiments, activity monitoring capability can be provided to products other than eyewear.

20 Claims, 10 Drawing Sheets

U.S. PATENT DOCUMENTS

| | | | |
|---|---|---|---|
| 4,608,492 A | 8/1986 | Burnham | |
| 4,683,587 A | 7/1987 | Silverman | |
| 4,751,691 A | 6/1988 | Perera | |
| 4,757,714 A | 7/1988 | Purdy et al. | |
| 4,773,095 A | 9/1988 | Zwicker et al. | |
| 4,806,011 A | 2/1989 | Bettinger | |
| 4,822,160 A | 4/1989 | Tsai | |
| 4,822,161 A | 4/1989 | Jimmy | |
| 4,942,629 A | 7/1990 | Stadlmann | |
| 4,962,469 A * | 10/1990 | Ono et al. | 702/160 |
| 4,985,632 A | 1/1991 | Bianco et al. | |
| 5,008,548 A | 4/1991 | Gat | |
| 5,020,150 A | 5/1991 | Shannon | |
| 5,036,311 A | 7/1991 | Moran et al. | |
| 5,050,150 A | 9/1991 | Ikeda | |
| 5,093,576 A | 3/1992 | Edmond et al. | |
| 5,148,023 A | 9/1992 | Hayashi et al. | |
| 5,151,600 A | 9/1992 | Black | |
| 5,161,250 A | 11/1992 | Ianna et al. | |
| 5,172,256 A | 12/1992 | Sethofer et al. | |
| 5,306,917 A | 4/1994 | Black et al. | |
| 5,353,378 A | 10/1994 | Hoffman et al. | |
| 5,359,370 A | 10/1994 | Mugnier | |
| 5,367,345 A | 11/1994 | da Silva | |
| 5,379,464 A | 1/1995 | Schleger et al. | |
| 5,382,986 A | 1/1995 | Black et al. | |
| 5,394,005 A | 2/1995 | Brown et al. | |
| 5,452,480 A | 9/1995 | Ryden | |
| 5,455,640 A | 10/1995 | Gertsikov | |
| 5,457,751 A | 10/1995 | Such | |
| 5,500,532 A | 3/1996 | Kozicki | |
| D369,167 S | 4/1996 | Hanson et al. | |
| 5,513,384 A | 4/1996 | Brennan et al. | |
| 5,533,130 A | 7/1996 | Staton | |
| 5,581,090 A | 12/1996 | Goudjil | |
| 5,589,398 A | 12/1996 | Krause et al. | |
| 5,590,417 A | 12/1996 | Rydbeck | |
| 5,608,808 A | 3/1997 | da Silva | |
| 5,634,201 A | 5/1997 | Mooring | |
| 5,686,727 A | 11/1997 | Reenstra et al. | |
| 5,715,323 A | 2/1998 | Walker | |
| 5,737,436 A | 4/1998 | Boyden | |
| 5,900,720 A | 5/1999 | Kallman et al. | |
| 5,941,837 A * | 8/1999 | Amano et al. | 600/595 |
| 5,946,071 A | 8/1999 | Feldman | |
| 5,980,037 A | 11/1999 | Conway | |
| 5,988,812 A | 11/1999 | Wingate | |
| 5,992,996 A | 11/1999 | Sawyer | |
| 5,995,592 A | 11/1999 | Shirai et al. | |
| 6,010,216 A | 1/2000 | Jesiek | |
| 6,013,919 A | 1/2000 | Schneider et al. | |
| 6,028,627 A | 2/2000 | Helmsderfer | |
| 6,046,455 A | 4/2000 | Ribi et al. | |
| 6,060,321 A | 5/2000 | Hovorka | |
| 6,061,580 A | 5/2000 | Altschul et al. | |
| 6,091,546 A | 7/2000 | Spitzer | |
| 6,091,832 A | 7/2000 | Shurman et al. | |
| 6,115,177 A | 9/2000 | Vossler | |
| 6,154,552 A | 11/2000 | Koroljow et al. | |
| 6,231,181 B1 | 5/2001 | Swab | |
| 6,236,969 B1 | 5/2001 | Ruppert et al. | |
| 6,243,578 B1 | 6/2001 | Koike | |
| 6,292,213 B1 | 9/2001 | Jones | |
| 6,301,367 B1 | 10/2001 | Boyden et al. | |
| 6,307,526 B1 | 10/2001 | Mann | |
| 6,343,858 B1 | 2/2002 | Zelman | |
| 6,349,001 B1 | 2/2002 | Spitzer | |
| 6,349,422 B1 | 2/2002 | Schleger et al. | |
| 6,409,338 B1 | 6/2002 | Jewell | |
| 6,426,719 B1 | 7/2002 | Nagareda et al. | |
| 6,478,736 B1 | 11/2002 | Mault | |
| 6,506,142 B2 | 1/2003 | Itoh et al. | |
| 6,513,532 B2 | 2/2003 | Mault et al. | |
| 6,517,203 B1 | 2/2003 | Blum et al. | |
| 6,539,336 B1 | 3/2003 | Vock et al. | |
| 6,542,081 B2 | 4/2003 | Torch | |
| 6,554,763 B1 | 4/2003 | Amano et al. | |
| 6,619,799 B1 | 9/2003 | Blum et al. | |
| 6,629,076 B1 | 9/2003 | Haken | |
| 6,729,726 B2 | 5/2004 | Miller et al. | |
| 6,736,759 B1 | 5/2004 | Stubbs et al. | |
| 6,764,194 B1 | 7/2004 | Cooper | |
| 6,792,401 B1 | 9/2004 | Nigro et al. | |
| 6,929,365 B2 | 8/2005 | Swab et al. | |
| 7,013,009 B2 | 3/2006 | Warren | |
| 7,031,667 B2 | 4/2006 | Horiguchi | |
| 7,073,905 B2 | 7/2006 | Da Pra' | |
| 7,192,136 B2 | 3/2007 | Howell et al. | |
| 7,255,437 B2 | 8/2007 | Howell et al. | |
| 7,312,699 B2 | 12/2007 | Chornenky | |
| 7,331,666 B2 | 2/2008 | Swab et al. | |
| 2001/0005230 A1 | 6/2001 | Ishikawa | |
| 2002/0081982 A1 | 6/2002 | Schwartz et al. | |
| 2002/0084990 A1 | 7/2002 | Peterson, III | |
| 2002/0089639 A1 | 7/2002 | Starner et al. | |
| 2002/0090103 A1 | 7/2002 | Calisto, Jr. | |
| 2002/0098877 A1 | 7/2002 | Glezerman | |
| 2002/0109600 A1 | 8/2002 | Mault et al. | |
| 2002/0140899 A1 | 10/2002 | Blum et al. | |
| 2002/0197961 A1 | 12/2002 | Warren | |
| 2003/0022690 A1 | 1/2003 | Beyda et al. | |
| 2003/0032449 A1 | 2/2003 | Giobbi | |
| 2003/0062046 A1 | 4/2003 | Wiesmann et al. | |
| 2003/0065257 A1 | 4/2003 | Mault et al. | |
| 2003/0067585 A1 | 4/2003 | Miller et al. | |
| 2003/0068057 A1 | 4/2003 | Miller et al. | |
| 2003/0226978 A1 | 12/2003 | Ribi et al. | |
| 2004/0000733 A1 | 1/2004 | Swab et al. | |
| 2004/0063378 A1 | 4/2004 | Nelson | |
| 2004/0096078 A1 | 5/2004 | Lin | |
| 2004/0150986 A1 | 8/2004 | Chang | |
| 2004/0156012 A1 | 8/2004 | Jannard et al. | |
| 2004/0157649 A1 | 8/2004 | Jannard et al. | |
| 2004/0160571 A1 | 8/2004 | Jannard | |
| 2004/0160572 A1 | 8/2004 | Jannard | |
| 2005/0067580 A1 | 3/2005 | Fontaine | |
| 2005/0213026 A1 | 9/2005 | Da Pra' | |
| 2005/0230596 A1 | 10/2005 | Howell et al. | |
| 2005/0248717 A1 | 11/2005 | Howell et al. | |
| 2005/0248719 A1 | 11/2005 | Howell et al. | |
| 2005/0264752 A1 | 12/2005 | Howell et al. | |
| 2006/0001827 A1 | 1/2006 | Howell et al. | |
| 2006/0003803 A1 | 1/2006 | Thomas et al. | |
| 2006/0023158 A1 | 2/2006 | Howell et al. | |
| 2007/0030442 A1 | 2/2007 | Howell et al. | |
| 2007/0046887 A1 | 3/2007 | Howell et al. | |
| 2007/0109491 A1 | 5/2007 | Howell et al. | |
| 2007/0186330 A1 | 8/2007 | Howell et al. | |
| 2007/0208531 A1 | 9/2007 | Darley et al. | |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |

| | | |
|---|---|---|
| TW | 484711 | 6/2001 |
| WO | WO 97/12205 A1 | 4/1997 |
| WO | WO 02/06881 A2 | 1/2002 |
| WO | WO 03/069394 A1 | 8/2003 |
| WO | WO 03/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.

"Camera Specs Take Candid Snaps", BBC News, Sep. 18, 2003, pp. 1-3.

"Cardo Wireless Attaching Clips and Wearing Headset", Cardo Systems, Inc., http://www.cardowireless.com/clips.php, downloaded Nov. 27, 2004, pp. 1-3.

"Environmental Health Criteria 14: Ultraviolet Radiation", International Programme on Chemical Saftey, World Health Organization Geneva, 1979 http://www.ichem.org., pp. 1-102.

"Eyetop", Product-Features, eyetop eyewear, eyetop belt worn, http://www.eyetop.net/products/eyetop/features.asp., downloaded Nov. 6, 2003, pp. 1-2.

"Exclusive Media Event Marks Debut of Oakley Thump: World's First Digital Audio Eyewear", Oakley Investor Relations, Press Release, Nov. 15, 2004, pp. 1-2.

"Heart Rate Monitors", http://www.healthgoods.com, downloaded Dec. 4, 2004.

"How is the UV Index Calculated", SunWise Program, U.S. Environmental Protection Agency, http://www.epa.gov/sunwise/uvcalc.html, downloaded Oct. 14, 2004, pp. 1-2.

"Industrial UV Measurements", APA Optics, Inc., http://www/apacoptics.com/uv/, downloaded Jul. 12, 2004, p. 1.

"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.

"Oakley Thump: Sunglasses Meet MP3 Player", with image, http://news.designtechnica.com/article4665.html, Jul. 13, 2004.

"Personal UV monitor," Optics.org, http://optics.org/articles/news/6/6/7/1 (downloaded Dec. 20, 2003), Jun. 9, 2000, pp. 1-2.

"SafeSun Personal Ultraviolet Light Meter", http://healthchecksystems.com/safesun.htm, downloaded Jul. 12, 2004, pp. 1-4.

"SafeSun Personal UV Meter", Introduction, Optix Tech Inc., http://www.safesun.com, downloaded Feb. 5, 2004, pp. 1-2.

SafeSun Personal UV Meter, features, Optix Tech Inc., http://www.safesun.com/features.html, downloaded May 1, 2004, pp. 1-2.

"Sharper Image—The FM Pedometer", e-Corporate Gifts.com, http://www.e-corporategifts.com/sr353.html, downloaded Jan. 22, 2005, pp. 1-2.

"Sun UV ™ Personal UV Monitor", APA Optics, Inc., http://www.apaoptics.com/sunuv/uvfacts.html, downloaded Dec. 20, 2003, pp. 1-3.

"Ultraviolet Light and Sunglasses", Oberon's Frequently Asked Questions, http://www.oberoncompany.com/OBEnglish/FAQUV.html, downloaded Feb. 5, 2004, pp. 1-2.

"Ultraviolet Light Sensor", Barrett & Associates Engineering, http://www.barrettengineering.com/project_uvs.htm, downloaded Feb. 5, 2004, pp. 1-3.

"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.

"What Are Gripples?", Gripping Eyewear, Inc., http://www.grippingeyewear.com/whatare.html, downloaded Nov. 2, 2005.

"With Racing Heart", Skaloud et al., GPS World, Oct. 1, 2001, http://www.gpsworld,com/gpsworld/content/printContentPopup.jsp?id=1805, pp. 1-5.

Abrisa Product Information: Cold Mirrors, Abrisa, date unknown, p. 1.

Abrisa Product Information: Commercial Hot Mirror, Abrisa, date unknown, p. 1.

Alps Spectable, Air Conduction Glass, Bone Conduction Glass, htt;://www.alps-inter.com/spec.htm, downloaded Dec. 10, 2003, pp. 1-2.

Altimeter and Compass Watches, http://store.yahoo.com/snowshack/altimeter-watches.html, downloaded May 3, 2004, pp. 1-2.

Bone Conduction Headgear HG16 Series, "Voiceducer," http://www.temco-j.co.jp/html/English/HG16.html, downloaded Dec. 10, 2003, pp. 1-3.

Carnoy, David, "The Ultimate MP3 Player for Athletes? Could be.", CNET Reviews May 14, 2001, pp. 1-4.

Clifford, Michelle A., "Acccelerometers Jump into the Consumer Goods Market", Sensors Online, http://www.sensorsmag.com, Aug. 2004.

Cool Last Minute Gift Ideas!, UltimateFatBurner Reviews and Articles, http://www.ultimatefatburner.com/gift-ideas.html, downloaded May 10, 2005, pp. 1-3.

Comfees.com, Adjustable Sports Band Style No.1243, http://shop.store.yahoo.com/comfees/adsportbansty.html,downloaded Apr. 18, 2003, pp. 1-2.

Dixen, Brian, "ear-catching", Supertesten, Mobil, date unknown, pp. 37-41.

Global Solar UV Index, A Practical Guide, World Health Organization, 2002, pp. 1-28.

Grobart, Sam, "Digit-Sizing Your Computer Data", News Article, Sep., 2004, p. 1.

Life Monitor V1.1, Rhusoft Technologies Inc., http://www.rhusoft.com/lifemonitor/,Mar. 1, 2003, pp. 1-6.

Manes, Stephen, "Xtreme Cam", Forbes Magazine, Sep. 5, 2005, p. 96.

Mio, PhysiCal, http://www.gophysical.com/, downloaded Jan. 27, 2004, 5 pages.

Monitoring Athletes Performance—2002 Winter Olympic News from KSL, Jan. 23, 2002, http://2002.ksl.com/news-3885i, pp. 1-3.

Niwa, "UV Index Information", http://www.niwa.cri.nz/services/urozone/uvi-info, downloaded Jul. 15, 2004, pp. 1-2.

Pärkkä, Juha, et al., "A Wireless Wellness Monitor for Personal Weight Management", VTT Information Technology, Tampere, Finland, date unknown, p. 1.

Pedometer, Model HJ-112, Omron Instruction Manual, Omron Healthcare, Inc., 2003, pp. 1-27.

PNY Announces Executive Attaché USB 2.0 Flash Drive and Pen Series, Press Release, PNY Technologies, Las Vegas, Jan. 8, 2004, pp. 1-2.

PNY Technologies, "Executive Attaché" http://www.pny.com/products/flash/execattache.asp downloaded Nov. 16, 2005.

Polar WM41 and 42 weight management monitor, http://www.simplysports/polar/weight_management/wm41-42.htm, downloaded Jan. 28, 2004, pp. 1-3.

Questions Answers, Pedometer.com, http:/www.pedometer.com, downloaded May 5, 2005.

RazrWire, Motorola, 2005, 1 page.

SafeSun Personal UV Meter, Scientific Data, Optix Tech Inc., http://www.safesun.com/scientific.html, downloaded May 1, 2004, pp. 1-3.

SafeSun Sensor, User's Manual, Optix Tech Inc., date unknown.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experiments.html, downloaded Feb. 5, 2004, pp. 1-2.

Shades of Fun, Blinking Light Glasses, http://www.shadesoffun.com/Nov/Novpgs-13.html, downloaded Jul. 9, 2005, pp. 1-4.

SportLine Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp. 1-3.

SunUV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Talking Pedometer, Sportline, Inc., date unknown.

Top Silicon PIN Photodiode, PD93-21C, Technical Data Sheet, Everlight Electronics Co., Ltd., 2004, pp. 1-9.

UV Light Meter, UVA and UVB measurement, UV-340, Instruction Manual, Lutron, date unknown, pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter, http://www.auravita.com/products/AURA/ORBU11420.asp. Downloaded Nov. 15, 2005, pp. 1-4.

* cited by examiner

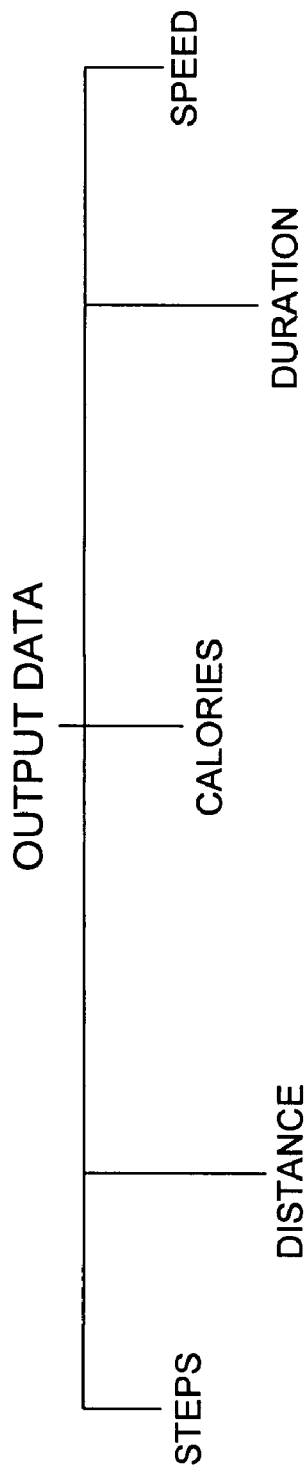
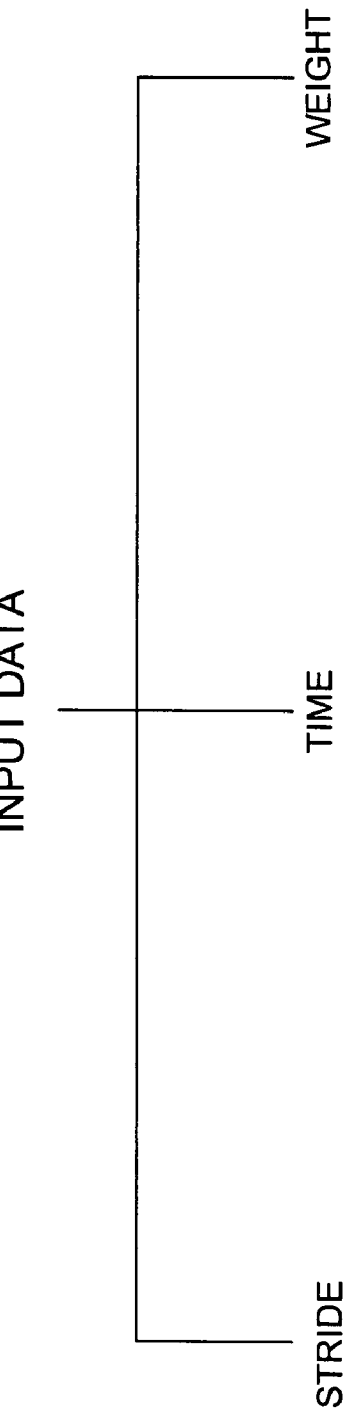
FIG. 5A
FIG. 5B

EYEGLASSES WITH ACTIVITY MONITORING AND ACOUSTIC DAMPENING

CROSS-REFERENCE TO RELATED APPLICATIONS

This application claims priority of U.S. Provisional Patent Application No. 60/846,150, filed Sep. 20, 2006, and entitled "EYEGLASSES WITH ACTIVITY MONITORING," which is hereby incorporated herein by reference.

This application is related to each of: (i) U.S. patent application Ser. No. 11/183,276 (now U.S. Pat. No. 7,255,437), filed Jul. 15, 2005, and entitled "EYEGLASSES WITH ACTIVITY MONITORING," which is hereby incorporated herein by reference; and: (ii) U.S. patent application Ser. No. 11/891,411, filed Aug. 9, 2007, and entitled "EYEGLASSES WITH ACTIVITY MONITORING," which is hereby incorporated herein by reference.

FIELD OF THE INVENTION

The present invention relates to eyeglasses and, more particularly, to eyeglasses having activity monitoring components.

BACKGROUND OF THE INVENTION

Traditionally, eyeglasses have not contained or made any use of electrical components. In recent years, attempts to include electrical components within eyeglasses have had limited success. For example, a small electrical component, such as a microphone, might be provided in or attached to an eyeglass frame. Unfortunately, however, larger scale electrical components are not easily provided in or attached to an eyeglass frame. Eyeglasses frames tend to be very compact and lightweight and thus have little space for electrical components. Moreover, since eyeglass frames are often fashionable items whose designs are important, there are substantial design tradeoffs involved with providing or attaching electrical components to eyeglass frames.

For many people, prescription eyeglasses are indispensable due to defects in their eyesight. Even for those who do not wear prescription glasses, it is very popular for people to wear sunglasses. In other words, many of us constantly carry at least one pair of glasses with us.

People also often separately wear or carry a pedometer. The traditional physical principal of a pedometer is that a pendulum mechanism moves as the gravity shock of a user's foot striking the ground occurs, and the movement of the pendulum is measured by counting pulses (e.g., electrical pulses). Pedometers are typically special purpose electrical devices worn by persons interested in determining how far they have walked. One good place to wear a pedometer is around one's waist. To be more accurate, users of pedometers have to enter stride information. This enables the distance traveled to be determined from a number of steps taken. Also, if one's weight is entered, the pedometer can determine calories consumed. For more strenuous activities than walking, pedometers tend to lose their effectiveness. In any event, a separate electrical device needs to be carried to monitor a user's activity.

Accordingly, there is a need for improved approaches to facilitate use of electrical components with eyeglasses.

SUMMARY OF THE INVENTION

In a number of embodiments, the invention pertains to eyewear having an activity monitoring capability. Activity, such as motion, steps or distance, can be measured by an activity detector. The measured activity can then be used in providing activity-related information to a user of the eyewear. Advantageously, the user of the eyewear is able to easily monitor their degree of activity, without the need to carry a separate electrical device. For quieter operation, acoustic dampening can be employed.

In one embodiment, the activity monitoring is provided by a pedometer. A pedometer can also be referred to as a pedometer system herein.

In one embodiment, all components for activity monitoring can be integrated with eyewear (e.g., eyeglasses), such as a frame (e.g., a temple of the frame) of the eyewear. As an example, the eyewear normally includes a pair of temples, and the components for activity monitoring can be embedded within one or both of the temples. In one implementation, all components for activity monitoring are integrated into a single temple of the frame of the eyewear. As an example, these components can be formed together on a substrate. The substrate with the components mounted and interconnected can be referred to as a module. Embedding such a module into the eyewear can thus provide the eyewear with activity monitoring capability with minimal disturbance to design features of the eyewear.

In one embodiment, the eyewear includes an activity detector, electrical circuitry and an output device. The eyewear can also include one or both of a battery and a solar cell to provide power to the electrical circuitry and possibly other components. Further, the eyewear can also include one or more additional sensors. Still further, the eyewear can also include one or more of a being-worn indicator, a memory for data storage, one or more switches, and communication capabilities.

The invention can be implemented in numerous ways, including as a system, device, apparatus, and method. Several embodiments of the invention are discussed below.

As a pair of glasses, one embodiment of the invention includes at least: a first lens holder having a first side and a second side; a second lens holder having a first side and a second side; a bridge element coupling the second side of the first lens holder to the first side of the second lens holder; a first temple coupled to the first side of the first lens holder; a second temple coupled to the second side of the second lens holder; and a pedometer system at least partially embedded in the glasses. The pedometer system including at least: a movable structure that moves in association with user movement. During operation the movable structure moves and causes the movable structure to be in electrical contact with a conductive surface. The conductive surface is in physical contact with an acoustic dampening material at least while the movable structure is in electrical contact with the conductive surface.

As a pair of glasses, another embodiment of the invention includes at least: a frame having at least a bridge and a pair of temples; and an activity monitor at least partially embedded in the frame and operable to measure activity associated with a user of the pair of glasses. The activity monitor includes a pendulum that is used in measuring the activity associated with the user, the pendulum moves in accordance with the activity associated with the user. The activity monitor further includes means for acoustically dampening noise induced by the pendulum.

As a method for operating a pedometer, one embodiment of the invention includes at least the acts of: receiving a count signal; determining whether the count signal is reliable; ignoring the count signal when it is determined that the count signal is not reliable; incrementing a total count when it is determined that the count signal is reliable; and outputting the total count or a value derived therefrom.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5A illustrates representative output data for a pedometer system (pedometer) according to one embodiment of the invention.

FIG. 5B illustrates representative input data for a pedometer system (pedometer) according to one embodiment of the invention.

DETAILED DESCRIPTION OF THE INVENTION

In a number of embodiments, the invention pertains to eyewear having an activity monitoring capability. Activity, such as motion, steps or distance, can be measured by an activity detector. The measured activity can then be used in providing activity-related information to a user of the eyewear. Advantageously, the user of the eyewear is able to easily monitor their degree of activity, without the need to carry a separate electrical device. For quieter operation, acoustic dampening can be employed. In other embodiments, the invention can provide activity monitoring capability to products other than eyewear.

In one embodiment, the activity monitoring is provided by a pedometer. A pedometer can also herein be referred to as a pedometer system.

In one embodiment, all components for activity monitoring can be integrated with eyewear (e.g., eyeglasses), such as a frame (e.g., a temple of the frame) of the eyewear. As an example, the eyewear normally includes a pair of temples, and the components for activity monitoring can be embedded within one or both of the temples. In one implementation, all components for activity monitoring are integrated into a single temple of the frame of the eyewear. As an example, these components can be formed together on a substrate. The substrate with the components mounted and interconnected can be referred to as a module. Embedding such a module into the eyewear can thus provide the eyewear with activity monitoring capability with minimal disturbance to design features of the eyewear.

Embodiments of different aspects of the invention are discussed below with reference to FIGS. 1-9. However, those skilled in the art will readily appreciate that the detailed description given herein with respect to these figures is for explanatory purposes as the invention extends beyond these limited embodiments.

A first aspect of the invention pertains to eyewear having a pedometer (or pedometer system). The pedometer provides the eyewear with an activity monitoring capability.

Figure 1:
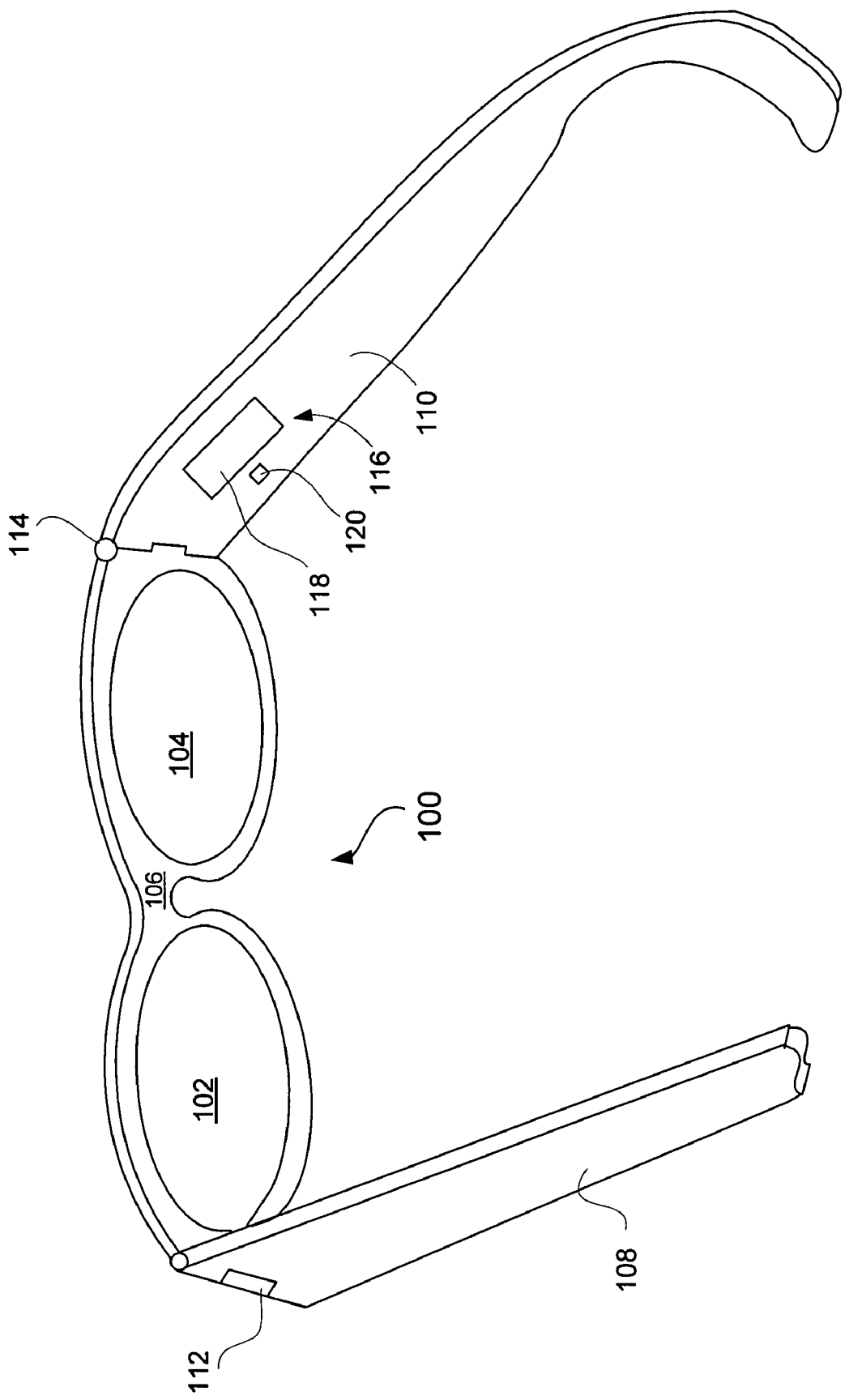
FIG. 1 illustrates a pair of glasses according to one embodiment of the invention.

FIG. 1 illustrates a pair of glasses 100 according to one embodiment of the invention. The pair of glasses 100 include a first lens holder 102 and a second lens holder 104. The lens holders 102 and 104 are capable of receiving lens. The lens can be prescription lens or non-prescription lens. The first lens holder 102 has a first side and a second side. The second lens holder 104 has a first side and a second side. The pair of glasses 100 also has a bridge 106. The bridge 106 is coupled to the second side of the first lens holder 102 and the first side of the second lens holder 104. The lens holders 102 and 104 and the bridge 106 can be separate pieces or a single integral piece. The glasses 100 can also be referred to as eyeglasses.

In addition, the pair of glasses 100 includes a pair of temples, namely, a first temple 108 and a second temple 110. The first temple 108 is pivotally secured to the first side of the first lens holder 102 by way of a joint (or hinge) 112. The second temple 110 is pivotally secured to the second side of the second lens holder 104 by way of another joint 114.

Moreover, the pair of glasses 100 further includes a pedometer 116. In this embodiment, the pedometer 116 is embedded in the temple 110. As illustrated in FIG. 1, the pedometer 116 includes a display 118 and a switch 120 that are exposed at the inside surface of the temple 110. The display 118 displays a visual indication of an output produced by the pedometer 116. In one implementation, the display 118 is a liquid-crystal display. The switch 120 can serve different functions depending on the embodiment. In general, various different types of switches can be used as the switch 120. In one implementation, the switch 120 is a push-button switch that serves as an on/off button. In another implementation, the switch 120 can be a slider switch. Different types of switches have previously been described in the related patent applications mentioned above and incorporated by reference.

In general, the pedometer 116 is at least partially embedded in the temple 110. In the embodiment shown in FIG. 1, the pedometer 116 is embedded in the temple 110 with the display 118 and the switch 120 being exposed. Other components of the pedometer 116, including various electrical components, are embedded in the temple 110 and not exposed.

In the embodiment shown in FIG. 1, the pedometer 116 is in the temple 110 of the pair of glasses 100 at a region close to its corresponding joint 114. The pedometer 116 faces the user when the user is wearing the pair of glasses 100. With the pedometer 116 in that position, in some cases, the wearer (user) may be able to see the pedometer information being output by the display 118 without the need to take the pair of glasses 100 off.

Although this embodiment provides the pedometer 116 in the temple 110, the pedometer 116 could alternatively be embedded in other parts of the eyeglass frame. With proper design, the overall appearance of the pair of glasses 100 can remain aesthetically pleasing, particularly when the pedometer 116 is substantially embedded in the eyeglass frame (e.g., the temple 110).

Figure 2:
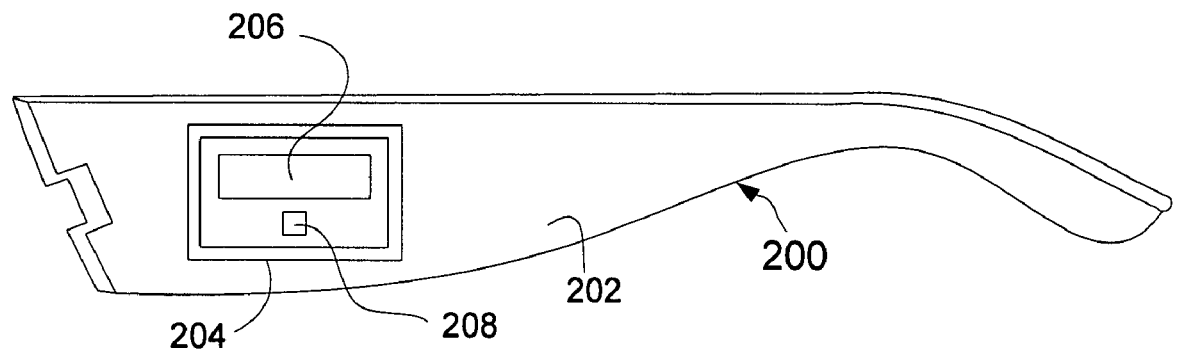
FIG. 2 illustrates a temple according to one embodiment of the invention.

FIG. 2 illustrates a temple 200 according to one embodiment of the invention. The temple 200 can, for example, represent another embodiment for the temple 110 of FIG. 1. In any case, the temple 200 includes an inside surface 202. The inside surface 202 has a removable cover 204. The removable cover 204 serves to cover a cavity within the temple 200 that includes electrical components associated with a pedometer. The removable cover 204 has a display opening 206 that aligns with a display of the pedometer, and a switch opening 208 that aligns with a switch. When the removable cover 204 is removed, the pedometer can be inserted into the cavity within the temple 200. However, with the removable cover attached, the pedometer is held within the cavity, yet the display of the pedometer can remain exposed because of its alignment with the display opening 206 and the switch can remain accessible because of its alignment with the switch opening 208.

FIG. 1 shows an embodiment with a pedometer facing inward towards the wearer when the glasses are being worn. Alternatively, the pedometer could be facing out and the user can temporarily remove the glasses to read pedometer output.

There are a number of benefits of having a pedometer with a pair of glasses. For one, if the pedometer is in the glasses, one does not need to separately carry a pedometer. Also, with the pedometer in the glasses, a user may be able to see his progress just by moving his eyes. For example, the pedometer can have a display and the display can be located close to a hinge of a temple, facing the user when the glasses are worn. In such case, the user does not have to move his hands or other parts of his body to monitor his progress; he only has to move his eyes to see the display and to track his progress while exercising. Similarly, in an embodiment with the pedometer and a speaker in the glasses, a user can hear his progress without the need for the volume of the audio signals to be high because the speaker can be relatively close to the user's ear.

Figure 3:
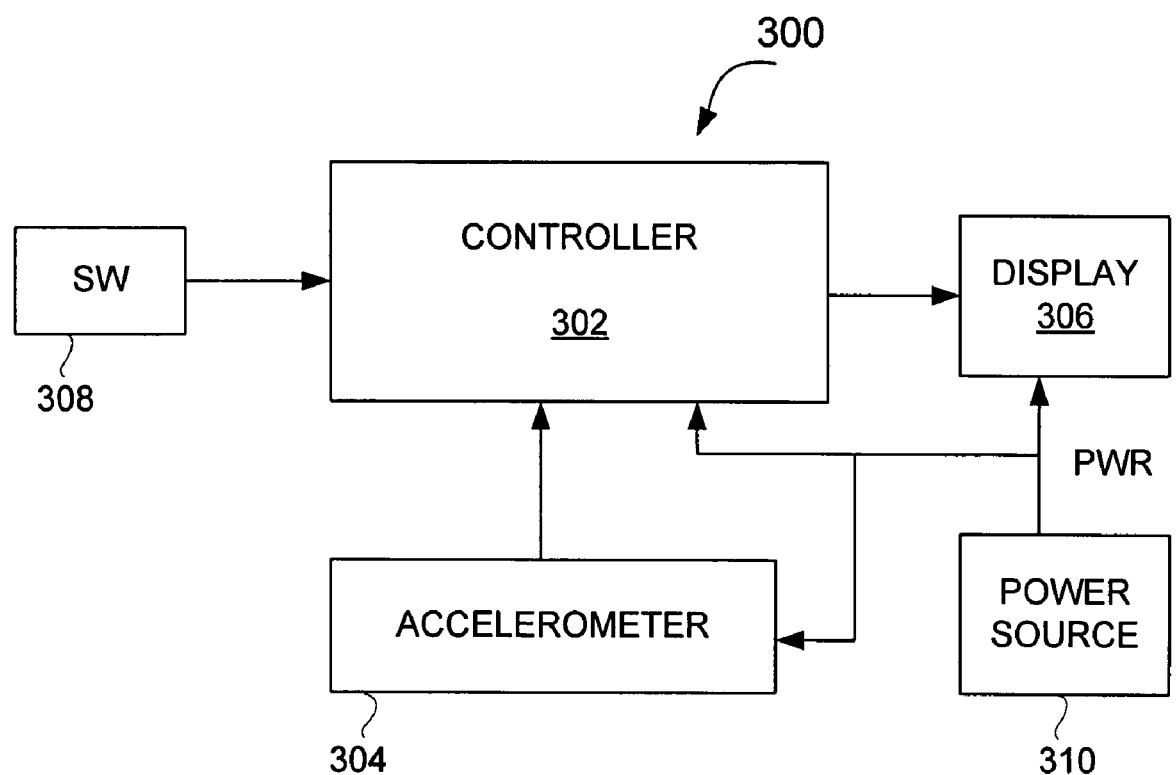
FIG. 3 is a block diagram of a pedometer system according to one embodiment of the invention.

FIG. 3 is a block diagram of a pedometer system 300 according to one embodiment of the invention. The pedometer system 300 can also be referred to as a pedometer. The pedometer system 300 is suitable for use as one implementation of the pedometer 116 illustrated in FIG. 1. The pedometer system 300 includes a controller 302 that controls overall operation of the pedometer system 300. An accelerometer 304 provides an input data signal to the controller 302. The controller 302 receives the input data signal from the accelerometer 304 and determines whether the output information produced on a display 306 should be altered or whether there should be an output on the display 306. The pedometer system 300 also includes a switch 308 and a power source 310. The switch 308 provides an input control signal to the controller 302. In one embodiment, the switch 308 can serve as an on/off switch. In another embodiment, the switch 308 can provide a reset operation for the output of the pedometer system 300. In still another embodiment, the switch 308 can be a light switch to provide light (e.g., back light) when activated so as to better illuminate the display 306. The display 306 can, for example, be a Liquid Crystal Display (LCD) type display. The power source 310 provides power to any or all of the controller 302, the accelerometer 304 and the display 306. The power source 310 can be implemented by a battery, kinetic energy device or solar cell, or some combination thereof. Although the switch 308 is not shown as being coupled to the power source 300, in another embodiment, the switch 308 could be interposed between the power source 310 and the other electrical components of the pedometer system 300 so as to provide a power-off mechanism.

More generally, the display 306 can be an output mechanism for the pedometer system 300. An alternative output mechanism is a speaker. In one embodiment, the glasses (e.g., glasses 100) can include a speaker to provide an output of the pedometer system 300. The speaker can be attached to or substantially internal to one of the glasses (e.g., a temple of the glasses). The glasses can also include more than one speaker. The speaker(s) can provide an audio output for the benefit of the user of the glasses. The audio output can be a speech output corresponding to a pedometer output (e.g., distance, calories, etc.). The audio output could alternatively be a sound, such as a sound effect. For example, a first sound could be output to indicate a $10^{th}$ of a mile increment, and a second sound could be output to indicate a mile increment.

In one embodiment, the pedometer is powered by a battery. The battery can, for example, be rechargeable by way of coupling to a charger through a connector at the glasses or by way of a solar cell. The solar cell can be coupled to or partially embedded in the pair of glasses. In one embodiment, the pair of glasses includes a hatch (e.g., removable cover) that can be opened to replace the battery which is embedded in the pair of glasses.

Figure 4D:
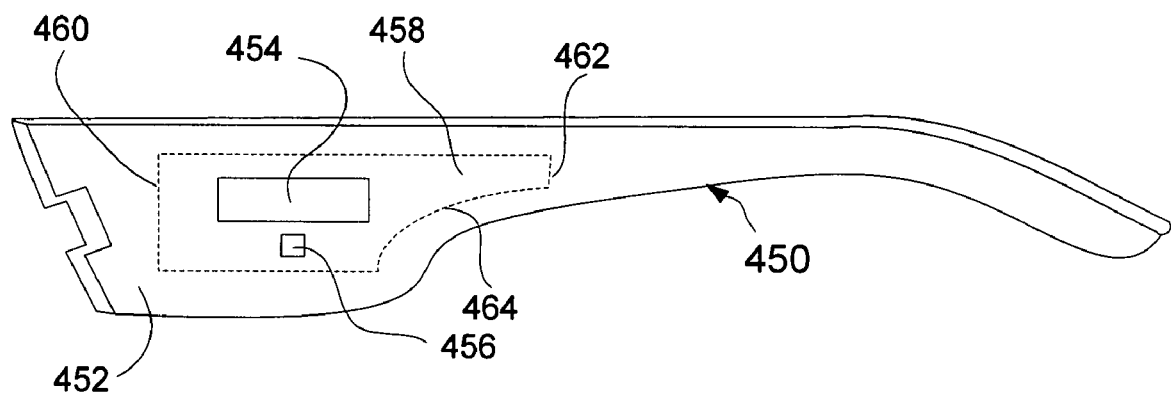
FIG. 4D illustrates a temple according to one embodiment of the invention.
Figure 4A:
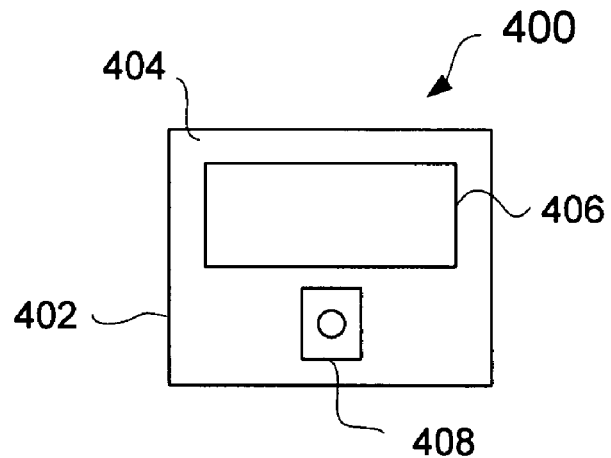
FIG. 4A illustrates a first side of an electrical system module according to one embodiment of the invention.

FIG. 4A illustrates an electrical system module 400 according to one embodiment of the invention. The electrical system module 400 in this embodiment operates as a pedometer system (pedometer). The electrical system module 400 includes a substrate 402. Mounted on a first side 404 of the electrical system module 400 is a display 406 and a pushbutton switch 408. The electrical system module 400 can, for example, be designed to be placed internal to a cavity within the frame of a pair of glasses.

Figure 4B:
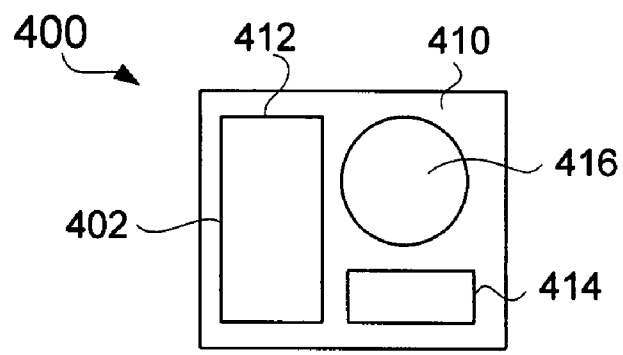
FIG. 4B illustrates a second side of the electrical system module illustrated in FIG. 4A.

FIG. 4B illustrates a second side 410 of the substrate 402 of the electrical system module 400. The second side 410 of the substrate 402 includes a controller chip 412, an accelerometer 414, and a battery 416.

Figure 4C:
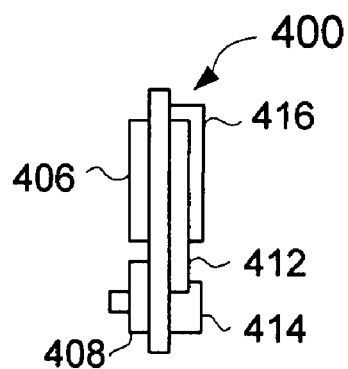
FIG. 4C illustrates a side view of the electrical system module illustrated in FIG. 4A.

FIG. 4C illustrates a side view of the electrical system module 400. The electrical system module 300 is generally small so as to fit within an eyeglass frame, as discussed above with reference to FIGS. 1 and 2. In this embodiment, the electrical system module 300 has electronic components on both sides of the substrate 402; however, it should be understood that all the electrical components could be on a single side, which could provide a profile with reduced thickness. The substrate 402 is for example, a Printed Circuit Board (PCB) or a tape for holding integrated circuits. In one example, the substrate 402 can be made of epoxy and glass, and in another example, the substrate 402 can be made of Kapton®, a brand of polyimide.

Further, in some embodiment, the substrate (e.g., PCB) can conform to the size and shape of the temple. FIG. 4D illustrates a temple 450 according to one embodiment of the invention. The temple 450 can, for example, represents another embodiment for the temple 110 of FIG. 1 or the temple 200 illustrated in FIG. 2. In any case, the temple 450 includes an inside surface 452. The inside surface 452 has a display opening 454 that aligns with a display of the pedometer (e.g., display 406), and a switch opening 456 that aligns with a switch. Both the display and the switch are mounted on a substrate. In this embodiment, a substrate 458 for the pedometer is housed internal to the temple 450. Moreover, in this embodiment, the substrate 458 is not rectangular but instead conforms to the configuration of the temple 450. In particular, the substrate 458 has a forward end 460 and a back-end 462. In this embodiment, the back-end 462 has a substantially reduced height as compared to the forward end 460. There is also a curved region 464 of the substrate 408 to transition between the forward end 460 and the back-end 462. A cavity is provided internal to the temple 450. In one embodiment, the cavity is designed to receive the substrate 460. Hence, in one embodiment, the cavity also has a non-rectilinear configuration. Since temples are often small and have a low profile, the substrate needs to likewise be small and have a low profile. However, a substrate with a rectangular configuration may not have enough surface area for all the electrical components to be provided on the substrate. However, by using a non-rectangular configuration for the substrate, there can be more surface area for the substrate. Additionally, in this way, an electrical system module (e.g., pedometer system) can be provided within the glasses with reduced impact on aesthetic design.

FIG. 5A illustrates representative output data for a pedometer system (pedometer) according to one embodiment of the invention. The output data can, for example, pertain to one or more of: steps taken, distance traveled, calories consumed, duration of activity, and speed of travel. The output data can be presented in a visual manner on a display of a pedometer system, such as the display 118, 206, 306 or 406 noted above. Alternatively, the output data can be presented in an audio manner via a speaker. The display and/or the speaker can be attached to or at least partially embedded within the pair of glasses having the pedometer system.

FIG. 5B illustrates representative input data for a pedometer system according to one embodiment of the invention. The input data can, for example, pertain to data that is input to the pedometer system to facilitate its operation. For example, the input data can include one or more of: stride information, time (i.e., current time), and/or weight of user. Although providing input data to the pedometer system is not necessary, for some embodiments, it is helpful to producing output data that is more accurate.

As noted above, the pedometer system can provide different types of outputs. For example, the display can show step count, i.e., a count for the number of steps taken by the user. The glasses can have an on/off switch to activate/deactivate the pedometer system. When the pedometer system is turned on, it can keep track of the number of steps taken by the user.

Another type of output can be distance traveled. The pedometer system can include a switch for stride-length adjustment. The switch can have three (3) positions—a long, a medium and a short stride, each with its corresponding distance. The user can set the switch at one of the positions. The pedometer system (e.g., controller 302) can then multiplied that distance by the step count to generate the distance traveled. In another embodiment, the user can enter his average stride distance into the glasses to provide a more accurate distance calculation. This can be done directly (e.g., inches, feet or centimeters) or indirectly (e.g., steps per $10^{th}$ of a mile or steps per kilometer).

Another type of output is time elapsed (i.e., duration). The pedometer system can include a timer to show time elapsed. With the timer, the controller can also divide distance traveled by time elapsed to provide a speed output or an average speed output.

The distance traveled could represent the horizontal distance traveled or the vertical distance (i.e. elevation) traveled. As one example, a pedometer can provide an estimate of distance traveled The speed can be acquired or determined, such as the rate of movement along the horizontal distance and/or the vertical distance traveled. In one embodiment, the pedometer system can further include an altimeter to measure vertical distance traveled. As another example, calories consumed can be determined (e.g., estimated) based on various physical and/or environmental conditions that can be measured or determined.

In one embodiment, the person can enter his weight into the pedometer. Based on the weight and the distance traveled, the pedometer can measure the number of calories burned, which are proportional to the weight and the distance traveled.

Figure 6:
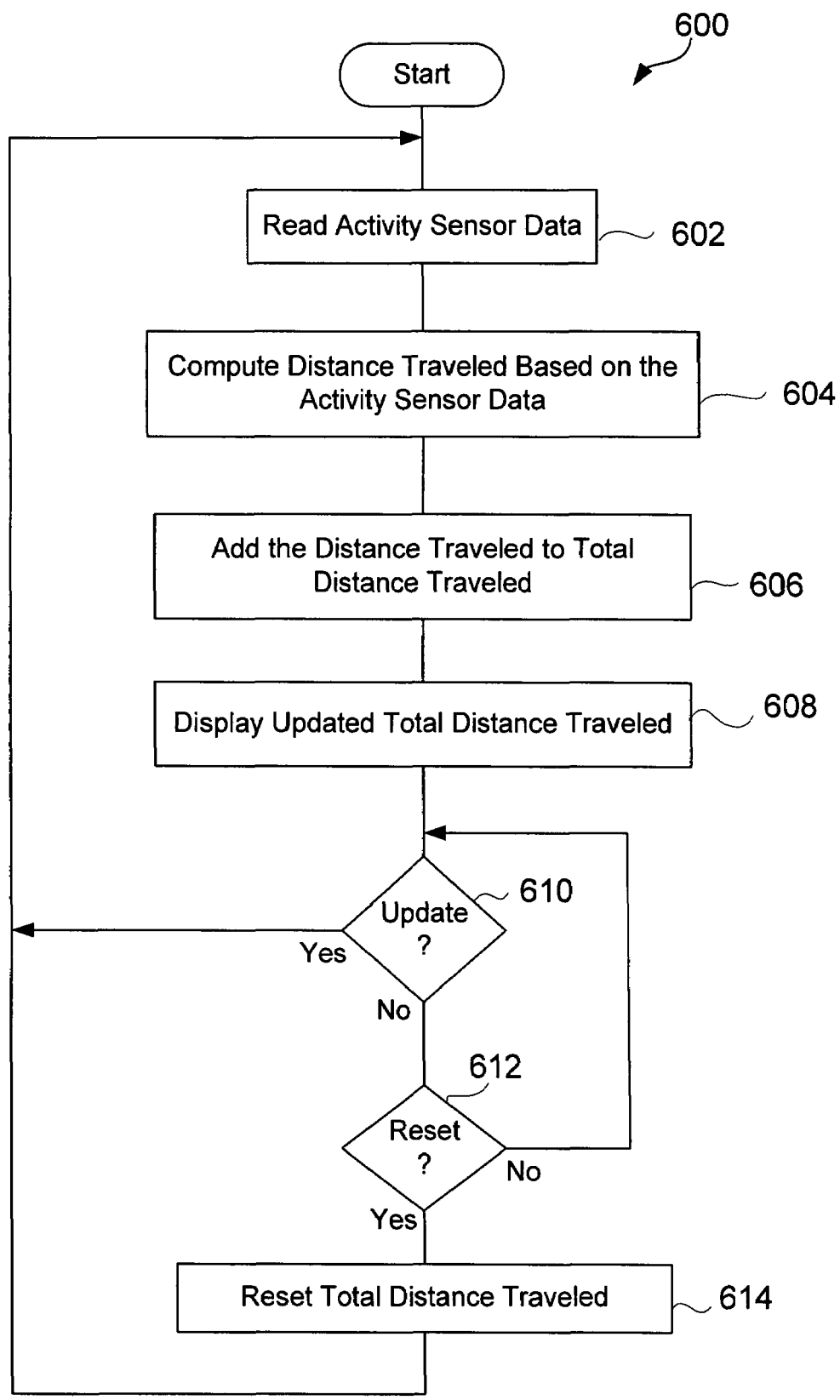
FIG. 6 is a flow diagram of a distance output process according to one embodiment of the invention.

FIG. 6 is a flow diagram of a distance output process 600 according to one embodiment of the invention. The distance output process 600 is, for example, performed by a pedometer system, such as the pedometer 116 or the pedometer system 300. The distance output process 600 operates to determine and then output a distance amount associated with a user of the pedometer (pedometer system). As noted above, a pedometer can output a distance traveled by the user of the pedometer.

The distance output process 600 initially reads 602 activity sensor (e.g., accelerometer) data. A distance traveled is then computed 604 based on the activity sensor data. Next, the distance traveled is added 606 to the total distance traveled. As a result, the total distance is updated to include the incremental distance that the user has traveled since the last instance of the distance output process 600. The updated total distance traveled is then displayed 608.

Next, a decision 610 determines whether to update the distance being monitored by the distance output process 600. When the decision 610 determines that an update is needed, the distance output process 600 returns to repeat the operation 602 and subsequent operations so that a next distance travel can be computed and processed in a similar manner. It should be noted that the distance traveled being displayed 608 can be rendered in any sort of units, including steps, miles, feet, meters, etc.

On the other hand, when the decision 610 determines that an update is not yet needed, a decision 612 determines whether a reset has been requested. When the decision 612 determines that a reset has not been requested, then the distance output process returns to repeat the decision 610 to again evaluate whether an update is needed. Here, the activity monitoring hardware can be inactive for a period of time (e.g., a delay time). This inactive period can provide low power operation of the activity monitoring hardware. In general, the less often updates occur, the less power consumed. Alternatively, when the decision 612 determines that a reset has been requested, the total distance traveled is reset 614 (i.e., cleared or set to zero). Following the operation 614, the distance output process 600 again returns to repeat the operation 602 and subsequent operations.

Pedometer designs can have various different structures. In one embodiment, an advantage of having a pedometer in the glasses can be due to the structure of one type of pedometer. In one approach, a pedometer includes a weight and a spring. In one embodiment, the pedometer can also include an LED, a photodetector and a controller. The weight is at the end of the spring, which can be a leaf spring. The weight with the spring have a resonant frequency that can be in the range of normal walking pace, such as 60-120 steps/minute. At that frequency, the weight with the spring will resonate. The resonance can be critically damped, such as by allowing the weight to go up and down beyond a threshold, but only once per step of the user. Normally, the photodiode receives light from the LED. When the weight goes beyond the threshold, it can block the light from the LED from reaching the photodiode. By measuring (e.g., counting) the number of times light is blocked and unblocked, a controller would be able identify the number of steps the user has walked. Based on such a structure, in one embodiment, for optimal performance, the orientation of the up-down motion of the weight should be substantially vertical. If a pedometer is a device you can clip onto a piece of clothing, a user can clip it on such that the orientation of the up-down motion of the weight is horizontal, which causes the performance of the pedometer to be substantially degraded. Glasses are usually worn in a standard position. The position, including the orientation, of the pedometer can thus be fixed relative to the glasses. Then, the orientation of the up-down motion of the weight can be fixed to be substantially vertical when the glasses are worn, or be substantially perpendicular to the orientation of the bridge of the glasses. This is another advantage of having a pedometer in the glasses in a number of embodiments.

In another embodiment, the pedometer can be automatically adjusted based on the types of exercise the user is engaging in, such as whether she is walking or jogging. For example, the resonance frequency, stride, or other parameter can be changed to provide a more accurate correspondence to whether the person is walking or jogging. There could alternatively be a switch that allows the person to change the pedometer from the walking mode to the jogging mode.

The activity monitoring can but need not be performed by a pedometer (pedometer system). That is, other activity monitoring systems besides pedometer systems can be used. In other words, a pedometer system can be replaced by an activity monitor. An activity monitor is a monitor of general activity. For example, the activity being monitored can correlate to movement of its user. Such movement may or may not correspond to distance traveled. For example, a pedometer system measuring steps taken by a user while working out at the gym would typically imply that the user is nevertheless active, albeit in a relatively confined area. In contrast, an activity monitor could better understand that the user is getting up and down many times and otherwise involved in a substantial amount of movement while at the gym. Similarly, homeowners cleaning the house engages in a lot of activity, but perhaps not requiring a comparable number of steps, as a jogger.

In one embodiment, the activity monitor can be partially or completely embedded in a pair of eyeglasses. Typically, the activity monitor includes an activity sensor and electronic circuitry in the pair of eyeglasses that monitors the activity, manipulates the monitored signals and provides an output of an activity indication to the user or interested party.

The activity sensor can sense user activity level. As an example, the user activity level can be used to provide a lifestyle indication. For example, a lifestyle indication can indicate to the user whether the user was active today or, alternatively, lazy today. The lifestyle indication can be displayed as a text or graphic symbol to inform the user or others of the activity level. For example, the lifestyle indication can be displayed by an output device (e.g., a LCD or LED display). The output device can be integrated with an eyeglass frame (e.g., at a temple portion of the eyeglass frame).

The activity level can pertain to a period of time, such as last 5 minutes, last hour, last 8 hours or last 24 hours. In one embodiment, within the time period, electronic circuitry can measure (e.g., count) motion (e.g. vibrations), such as via an accelerometer or other motion indicators. When motion exceeds a threshold, a count can be increased. The count total for the period of time can then be compared to an index. The index can then provide an activity level, which can be numeric (e.g., 1-10 rating), textual (e.g., lazy, slow, moderate, active) or graphical. For example, in a given day, a count can be accumulated, and then the activity level can be re-determined based on the accumulated count at the end of each day. The following table is representative of the correspondence between count value, thresholds (TH), and activity level.

| Count | Activity Level |
|---|---|
| < or = TH1 | Lazy |
| >TH1 but < or = TH2 | Slow |
| >TH2 but < or = TH3 | Moderate |
| >TH3 | Active |

These activity levels can also be linked to numerical or graphical indicators which can be displayed on an output device. The output via the output device can provide a current activity and/or a cumulative activity level, which can be a cumulative daily activity level. The output can also be displayed relative to one or more benchmarks.

When there is no motion or essentially no motion, the monitoring system can power-off or enter a low-power mode, and thus stop performing activity processing or providing any activity indication at an output device.

In one embodiment, the activity sensor can be implemented using an accelerometer or a vibration sensor. In another embodiment, the activity sensor can be implemented using a pedometer, which can be either a mechanical or electrical pedometer. In yet another embodiment, the activity can be implemented using a GPS receiver. In still other embodiment, the activity sensor can be implemented using a combination of any of the foregoing. In yet another embodiment, a plurality of activity sensors can be utilized. Such multiple activity sensors can be processed separately or in combination.

In one embodiment, the activity sensor is a pedometer. For example, the pedometers can be based on a piezo-electric element, which does not need to have moving parts and thus can be more quiet. Other examples of pedometers can be based on movements of mechanical parts or mechanical pedometers.

Classically, a mechanical pedometer uses a pendulum that moves in association with user movement. The pendulum can include a level arm which can swing downward as a user takes a step and then is returned upward by a spring. The spring can be, for example, a coiled spring or a hairspring. Typically, the pendulum is provided internal to a small housing that is being worn by a user, usually at the waist of the user.

As noted above, in different embodiments, a pedometer can be integrated with eyewear. For example, all components for a pedometer can be integrated with eyewear (e.g., eyeglasses), such as in a frame (e.g., a temple of the frame) of the eyewear. In different embodiments, the pendulum of the mechanical pedometer can make an audible sound (e.g., clicking sound) as it strikes a surface (e.g., metal surface) within the pedometer housing. With the pedometer placed within eyewear, the pendulum can be proximate to at least one of the user's ears. Some users like the clicking sound because they remind them that they are exercising, and their exercise is being calibrated or monitored by a working pedometer. On the other hand, some users may not like to have the clicking sound. They may find the audible sound being produced to be bothersome.

Another aspect of the invention pertains to techniques to dampen the audible sound being produced by a mechanical pendulum within a pedometer housing. In one embodiment, the invention provides a dampening material within the pedometer housing.

Figure 7A:
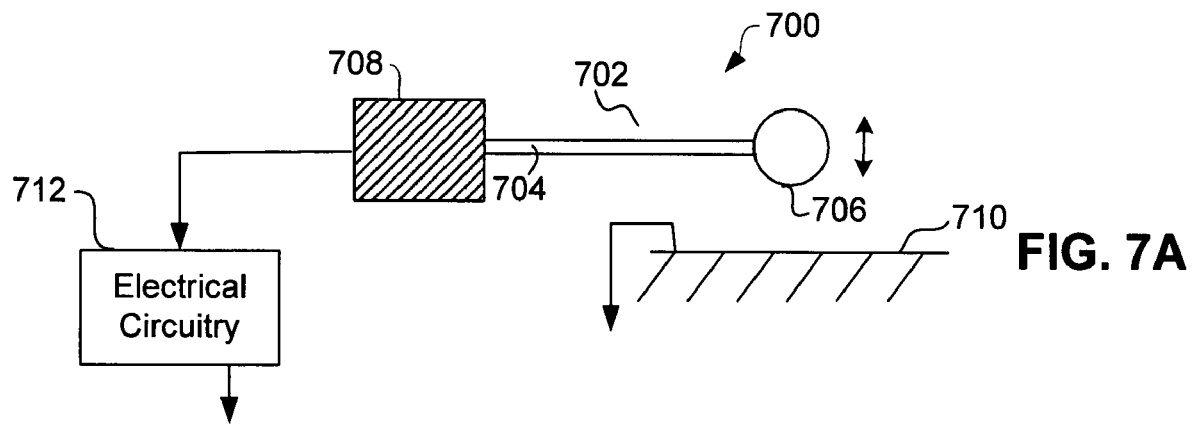
FIG. 7A is diagram of an example of a conventional pedometer.

FIG. 7A is diagram of an example of a conventional pedometer 700. The pedometer 700 includes a pendulum 702 within a pedometer housing. The pendulum 702 includes an arm 704 and a mass 706, such as a drum. The mass 706 is at one end of the arm 704 and a structure 708 fixes the other end of the arm 704. As the pedometer 700 moves, such as through user movement, the pendulum 702 moves, namely, the mass 706 at the one end of the arm 704 moves such that the mass 706 contacts a fixed conductive surface 710 in the pedometer housing. The contacting of the mass 706 with the fixed conductive surface 710 produces an electrical signal that can be sensed by electrical circuitry 712 and used in calculating distance traveled, calories consumed or the like. For some users, the audible sound that results from the contacting of the mass 706 with the fixed conductive surface and/or the pedometer housing can be distracting and otherwise undesirable.

Figure 7B:
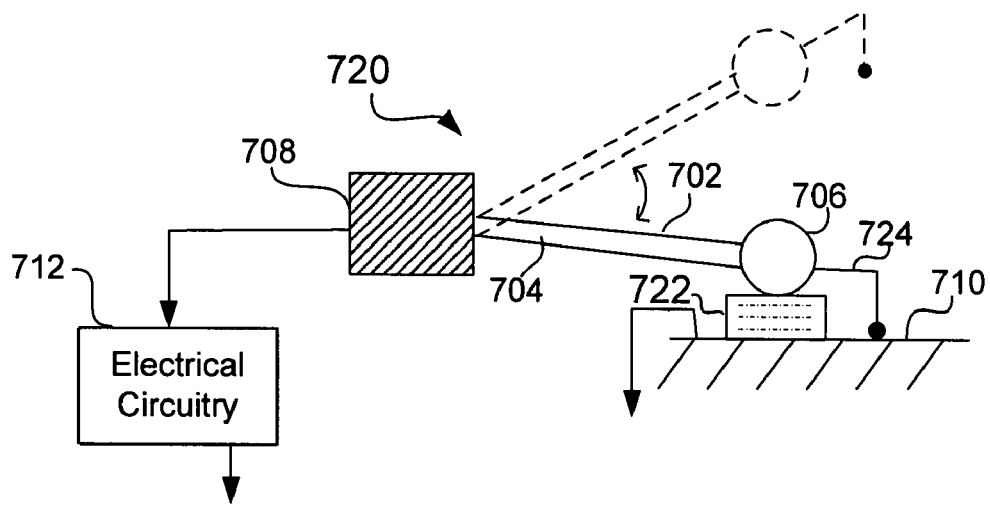
FIG. 7B is a diagram of a pedometer according to one embodiment of the invention.

FIG. 7B is a diagram of a pedometer 720 according to one embodiment of the invention. The pedometer 720 having a pendulum 702 within a pedometer housing. The pendulum 702 includes an arm 704 and a mass 706, such as a drum. The mass 706 is at one end of the arm 704 and a structure 708 fixes the other end of the arm 704. As the pedometer 720 moves, such as through user movement, the pendulum 702 moves, namely, the mass 706 at the one end of the arm 704 moves such that the mass 706 contacts a dampening material 722 interposed between the mass 706 and a fixed conductive surface 710 of the pedometer housing. In one embodiment, the dampening material 722 is non-conductive, such as rubber or silicone rubber. To provide the electrical connection from the pendulum 702 and the fixed conductive surface 710, the pedometer 720 can provide a conductive arm 724 of a relatively small mass as compared to the mass 706. Hence, as the small mass strikes the dampening material 722, the conductive arm 724 contacts the fixed conductive surface 710 so that the event can be electronically tracked. The contacting of the mass 706 with the fixed conductive surface 710 produces an electrical signal that can be sensed by electrical circuitry 712 and used in calculating distance traveled, calories consumed or the like. The conductive arm 724 can also be referred to as an auxiliary arm.

In an alternative embodiment, the dampening material 722 can be acoustically dampening while also being conductive, such as a piece of conductive silicone rubber. Here, the conductive arm 724 is not needed as the electrical connection can be made through the dampening material 722 which is adequately conductive. The contacting of the mass 706 with the dampening material 722 which is placed on the fixed conductive surface 710 produces an electrical signal that can be sensed by electrical circuitry 712 and used in calculating distance traveled, calories consumed or the like.

Figure 7C:
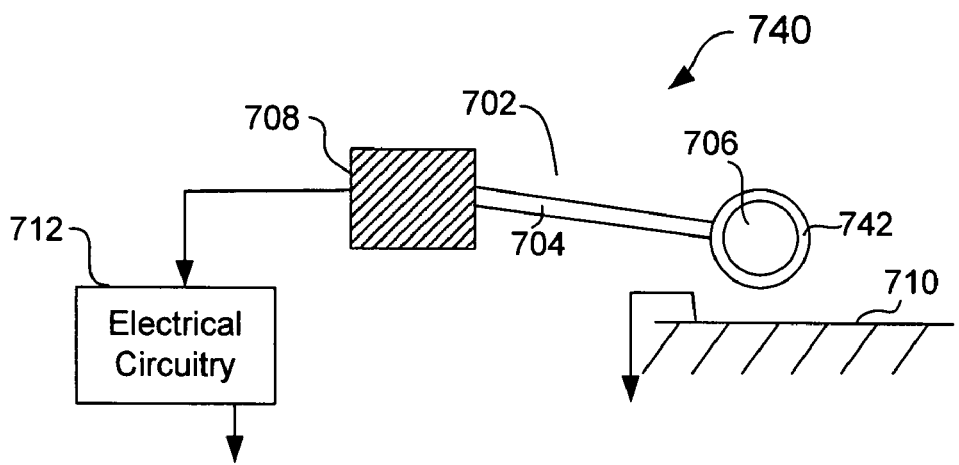
FIG. 7C is a diagram of a pedometer according to another embodiment of the invention.

FIG. 7C is a diagram of a pedometer 740 according to another embodiment of the invention. In this embodiment, the mass 706 is covered by a dampening material 742. The dampening material 742 is acoustically dampening while also being conductive, such as conductive silicone rubber. The contacting of the dampening material 742 provided on the mass 706 with the fixed conductive surface 710 produces an electrical signal that can be sensed by electrical circuitry 712 and used in calculating distance traveled, calories consumed or the like.

Figure 7D:
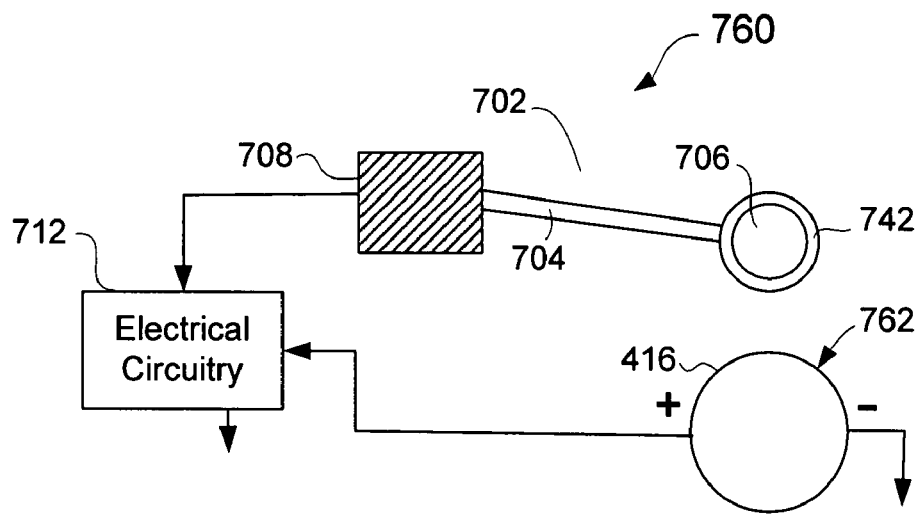
FIG. 7D is a diagram of a pedometer according to still another embodiment of the invention.

FIG. 7D is a diagram of a pedometer 760 according to still another embodiment of the invention. The pedometer 760 is similar to the pedometer 740 illustrated in FIG. 7C. However, the pedometer 760 with the dampening material 742 contacts a battery 762 (also provided within the pedometer housing), which provides power for the electrical circuitry 712. As the pedometer 760 moves, such as through user movement, the pendulum 702 moves, namely, the mass 706 at the one end of the arm 704 moves such that the mass 706 (surrounded by the dampening material 742) contacts the conducting surface of the battery 762 directly. The direct contact produces an electrical signal that can be sensed by electrical circuitry 712 and used in calculating distance traveled, calories consumed or the like. By contacting the battery 762 directly the audio sound produced due to the contact is reduced given that the mass of the battery 762 is substantially greater that the fixed conductive surface 710 (which can be a metal plate). Further, in this embodiment, acoustic dampening can be further provided by having a dampening material 742 about the mass 706 of the pendulum as shown in FIG. 7C. As previously noted, the dampening material 742 is acoustically dampening while also being conductive, such as conductive silicone rubber.

In an alternative embodiment, the dampening material can be placed on at least a portion of the battery 762 so that further acoustic dampening can be obtained. The dampening material can be acoustically dampening while also being electrically conductive, such as made of conductive silicone rubber.

Figure 7E:
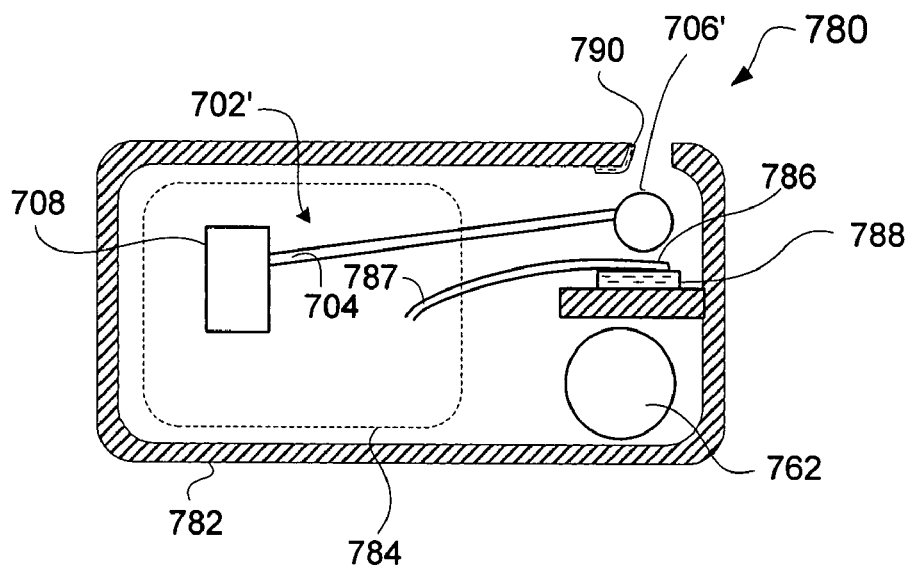
FIG. 7E is a diagram of a pedometer according to yet still another embodiment of the invention.

FIG. 7E is a diagram of a pedometer 780 according to yet still another embodiment of the invention. The pedometer 780 includes features similar to the pedometer 720 illustrated in FIG. 7B without the conductive arm 724. However, in this embodiment, the pedometer 780 is illustrated within a housing 782 (e.g., pedometer housing). In FIG. 7E a representative exposed internal area of the housing 782 is illustrated. The pedometer 780 is provided internal to the housing 782. The housing 782 includes a pendulum 702' as well as a battery 762 and a printed circuit board 784 as shown to be below the pendulum 702'.

As the pedometer 780 moves, such as through user movement, the pendulum 702' moves, namely, a mass 706' at the one end of the arm 704 moves such that the mass 706' contacts a conductive element 786 provided on an acoustically dampening material 788. In this embodiment, the acoustically dampening material 788 need not be conductive. As one example, the dampening material 788 can be a small piece (e.g., layer) of foam. As another example, the dampening material 790 can be rubber or silicone rubber. The dampening material 788 can also be considered an elastic material. Here, the mass 706' can be made smaller than the mass 706 illustrated in FIGS. 7A-7D. For example, the mass 706' can be in the shape of a disk, with a diameter on the order of 4 mm. The mass 706' therefore can be lighter than the mass 706 so that audio sounds generated when the mass 706' strikes a contact can be reduced. Furthermore, the presence of the dampening material 788 serves to acoustically dampen audio sounds generated when the mass 706' strikes the conductive element 786. The conductive element 786 is, for example, a conductive wire, strip or plate. The conductive element 786 is electrically connected to the printed circuit board 784 via a conductive extension 787, which only a portion is shown in FIG. 7E. The conductive extension enables electrical circuitry 712 provided on the printed circuit board 784 to sense an electrical signal when the mass 706' contacts the conductive element 786. Hence, as in other embodiments noted above, the electrical circuitry 712 can calculate distance traveled, calories consumed or the like. Optionally, the pedometer 780 can further include an opening at the upper portion of the housing. The opening reduces the contact surface the mass 706' made if and when the mass 706' hits the housing 782. In addition, there can be dampening material 790 (e.g., non-conductive) that is provided on an inner surface of the housing 782, such as at the edge of the opening. Then, instead of hitting the housing material directly, the mass 706' hits the dampening material 790. As one example, the dampening material 790 can be a small piece of foam. As another example, the dampening material 790 can be rubber or silicone rubber. The dampening material 790 can acoustically dampen an audio sound that might otherwise be prevented if the mass 706' contacts the inner surface of the housing 782 directly. As another option, the conductive extension 787 can be provided as a spring to provide additional flexibility to the conductive element 786.

Figure 7F:
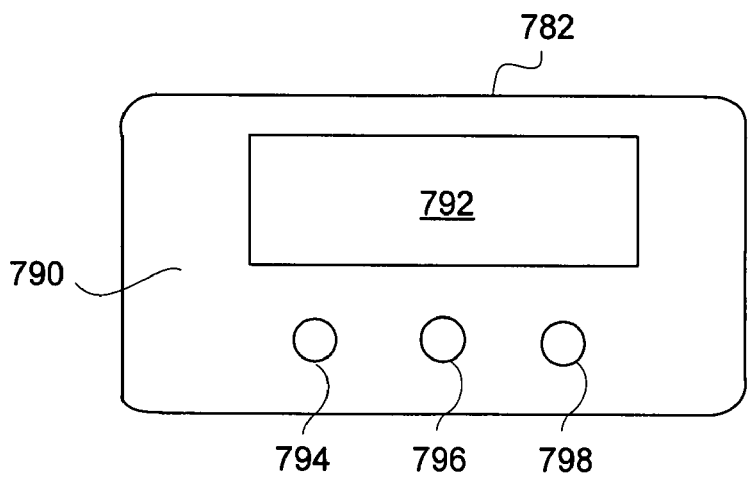
FIG. 7F is a diagram of a representative front side of the pedometer illustrated in FIG. 7E according to an embodiment of the invention.

FIG. 7F is a diagram of a representative front side 790 of the pedometer 780 illustrated in FIG. 7E according to one embodiment. The front side 790 includes a display 792 and three buttons 794, 796 and 798. As an example, the button 794 can pertain to a reset operation, the button 796 can pertains to a adjustment button (e.g., stride setting), and the button 798 can pertain to a mode selection (e.g., distance, calories or count)

Any of the other pedometers illustrated in FIGS. 7A-7D can be similarly provided within a housing, such as the housing 782 illustrated in FIGS. 7E and 7F.

In one embodiment, the pedometer, or parts thereof, including a pendulum, can be provided on a small scale, even a nano-scale.

Figure 8:
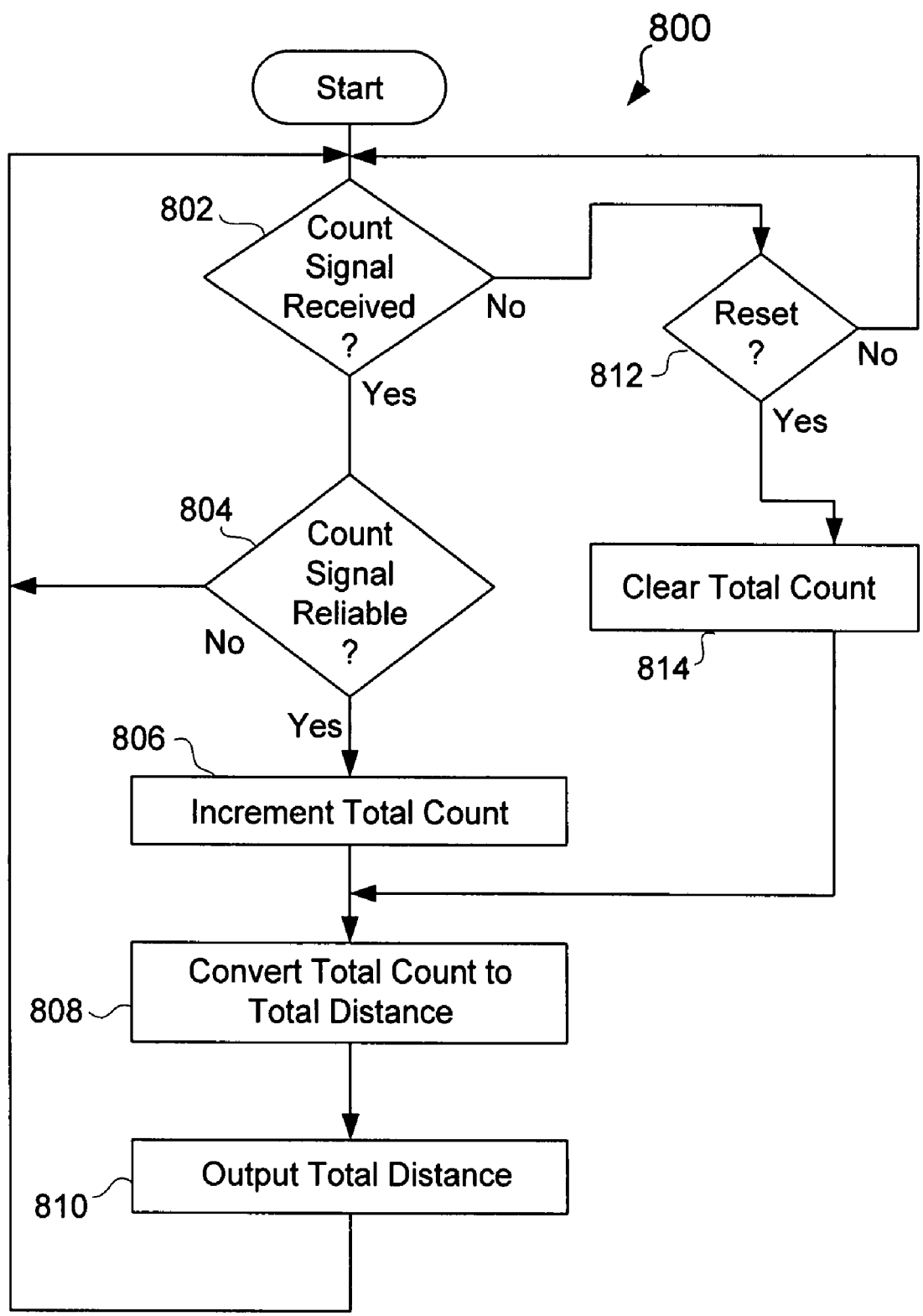
FIG. 8 is a flow diagram of a pedometer process according to one embodiment of the invention.

Another aspect of the invention pertains to a method for operating a pedometer or pedometer system. FIG. 8 is a flow diagram of a pedometer process 800 according to one embodiment of the invention. The pedometer process 800 can be performed on any of the pedometers or pedometer systems noted in this patent application.

The pedometer process 800 begins with a decision 802 that determines whether a count signal has been received. The count signal, for example, can correspond to the contact of the pendulum with a contact surface so as to signal a count. When the decision 802 determines that a count signal has been received, a decision 804 determines whether the count signal is reliable. The reliability of the count signal can be evaluated in a variety of ways. In one implementation, a series of counts within a window of time and with no more counts for another consecutive window of time can be used to distinguish walking/running from random movements. Examples of random movements include taking off/putting on eyewear having the pedometer, and the like. To illustrate, a first four counts within three seconds is ignored if the counts are followed by no counts in the consequent six seconds. In another implementation, successive counts that occur too close to one another to correspond to walking or running can be designated as random movements. Regardless, to provide reliable count of a user's walking or running, counts that are not due to running or walking can be filtered out (and thus ignored). As noted above, according to one implementation, the pedometer 780 illustrated in FIG. 7E can use a mass 706' that is reduced in size so as to generate less contact noise. However, the smaller the reduced mass 706' is, the more sensitive the pedometer 780 is to movements of all types. Hence, the pedometer process 800 is well suited for filtering out counts that are not associated with user movements of the type to be measured by a pedometer.

In other embodiment, filtering of count signals may not be desired. For example, if the pedometer or pedometer system is merely used as a counter for the user, than filtering out counts may not be required or desired.

In another embodiment, filtering of count signals is provided to filter those counts that occur while the pedometer or pedometer system is not in proper use. For example, when the pedometer or pedometer system is embedded in eyewear, a being-worn sensor can be used to indicate that the eyewear is not being worn. If the sensor indicates that the eyewear is not being worn, then count signals that have registered will be filtered or ignored.

Nevertheless, when the decision 804 determines that the count signal is not reliable, the count signal is ignored and processing returns to repeat the decision 802 and subsequent blocks. On the other hand, when the decision 804 determines that the count signal is reliable, then a total count is incremented 806.

The total count can be used for different applications. In one embodiment, the total count can be converted 808 to a total distance. The total distance can then be output 810. For example, the total distance can be output visually on a display device or output in an audio manner via a speaker. After the total distance is output 810, the pedometer process 800 can return to repeat the block 802 and subsequent blocks so that subsequent count signals can be processed in a similar manner.

Alternatively, when the decision 802 determines that a count signal has not been received, a decision 812 determines whether a reset operation has been requested. As an example, a reset operation can be requested by a user pressing a button coupled to or being part of the pedometer or pedometer system. When the decision 812 determines that a reset operation has not been requested, the pedometer processing 800 returns to repeat the decision 802 to await a count signal. On the other hand, when the decision 812 determines that a reset operation has been requested, the total count is cleared 814 and the processing proceeds to perform blocks 808 and 810 so the output of the total distance can be updated (e.g., zeroed).

Although the pedometer process 800 discussed in FIG. 8 provides a distance output, it should be understood that the output could alternatively be in the format of, for example, calorie or count output.

In one embodiment, an activity sensor can be used to measure distance traveled. In another embodiment, the activity sensor can acquire a position. The relative change in position over time can be used to determine a distance traveled. Then, the distance traveled over time can be used to correlate to an activity level. The activity level can then be displayed in any of the various ways noted above. In other embodiment, the activity sensor can be used to measure minimum activity (e.g., sleeping). In still another embodiment, the activity sensor can be used to measure velocity or acceleration.

In one embodiment, an activity monitoring system which provides monitoring and display of activity information can be at least partially embedded in a pair of eyeglasses. In another embodiment, the activity monitoring system can be at least partially embedded in at least one temple of a pair of eyeglasses. Optionally, the pair of glasses can further include one or other sensors discussed herein or in related applications. At least one of the sensors can be remote from the pair of eyeglasses (and utilizes wireless or wired communication to interact).

In yet still another embodiment, the activity monitor can operate as a calorie counter. In such case, data from an activity sensor can be converted into estimated calories consumed by, for example, the wearer of the glasses. The glasses may permit a user to enter his weight, or there can be a series of glasses each being utilized for different weight ranges. An output device provided with a pair of such glasses can inform the user of the calories consumed, such as throughout the day.

The glasses can also include a reset button or on/off switch so that calorie count can be cleared. The glasses might also store calorie information for a plurality of days and permit uploading such data to a computer (wirelessly or via a connector provided with the glasses).

There can also be a memory device to keep track of the activity information for a number of days. The activity monitoring system can include or couple to a controller that controls storage and retrieval of the information to and from the memory device.

In one embodiment, the activity monitoring system (e.g., pedometer) has an automatic off feature that allows a controller to automatically turn off or deactivate the activity monitoring system if the activity monitoring system does not sense any steps taken by the user for a predetermined period of time, such as two (2) minutes.

In different embodiments, the glasses can be more geared towards sports. The glasses can be a pair of sports glasses, swimming goggles, or protective goggles for playing different types of sports, such as racquetball.

In still another embodiment, a pair of eyeglasses can include or utilize a sensor to serve as a stress monitor. For example, stress can be estimated in view of blood pressure which can be evaluated with a blood pressure sensor and/or in view of pulse rate which can be evaluated with a pulse rate sensor. As another example, blood pressure or pulse rate sensors together with activity can be used to estimate stress.

The activity monitoring system can also include one or more switches with the eyewear. The switches can, for example, facilitate user input or control with respect to the activity monitoring system. For example, the switches can provide one or more of on/off, reset, on, on (and reset), and calibration. The activity monitoring system can also provide a user with an indication of whether the system is currently on or off, such as by a graphical image on a display device or by a LED. The one or more switches can also be used to change operational settings, such as threshold levels, output type, user preferences, user physical characteristics (e.g., stride, weight), operational mode, or activation/deactivation of auxiliary sensors, if any.

The activity monitoring system can have a "being-worn" switch. In one embodiment, the "being-worn" switch enables the activity monitoring system to automatically determine when to monitor activity and when not to monitor activity. In particular, the activity can be monitored when an eyeglass frame having the activity monitoring system is "being-worn" and not when the eyeglass frame is not "being-worn." The "being-worn" switch can be positioned in the temple portion with the other components of the activity monitoring system. In one embodiment, the activity monitoring system is provided, as a module as noted above, and which further includes a switch. The switch can, for example, be a "being worn" switch. By having the switch integral with the module, the manufacture and assembly of the end-product having the activity monitoring system can be simplified. As examples, the "being-worn" switch can be an optical, magnetic or mechanical switching device.

The "being-worn" switch can make use of the situation that the temples are in an open position when the eyeglass frame is being worn, and in a closed position when not being worn. In one embodiment, the "being-worn" switch can be positioned at a temple proximate to a region that couples the temple to its corresponding lens holder. For example, the activity monitoring system (e.g., module) can be provided within the temple region near the end of the temple so that the "being worn" switch is adjacent the lens portion of the eyeglass frame.

The "being worn" switch can also be used by a user to signal the activity monitoring system to provide its output at an output device, such as a display device. For example, when the "being worn" switch is initially closed (i.e., being worn), the activity monitoring system can output its text or graphical output to the display device. Typically, the displayed output would be displayed only for a limited period of time (e.g., 10 seconds). Such an approach is typically more power efficient, yet permits the user to obtain the output information when desired. Alternatively, another switch (e.g., dedicated output switch) could be used to cause the output to be displayed for a limited period of time or while the switch is depressed.

Figure 9:
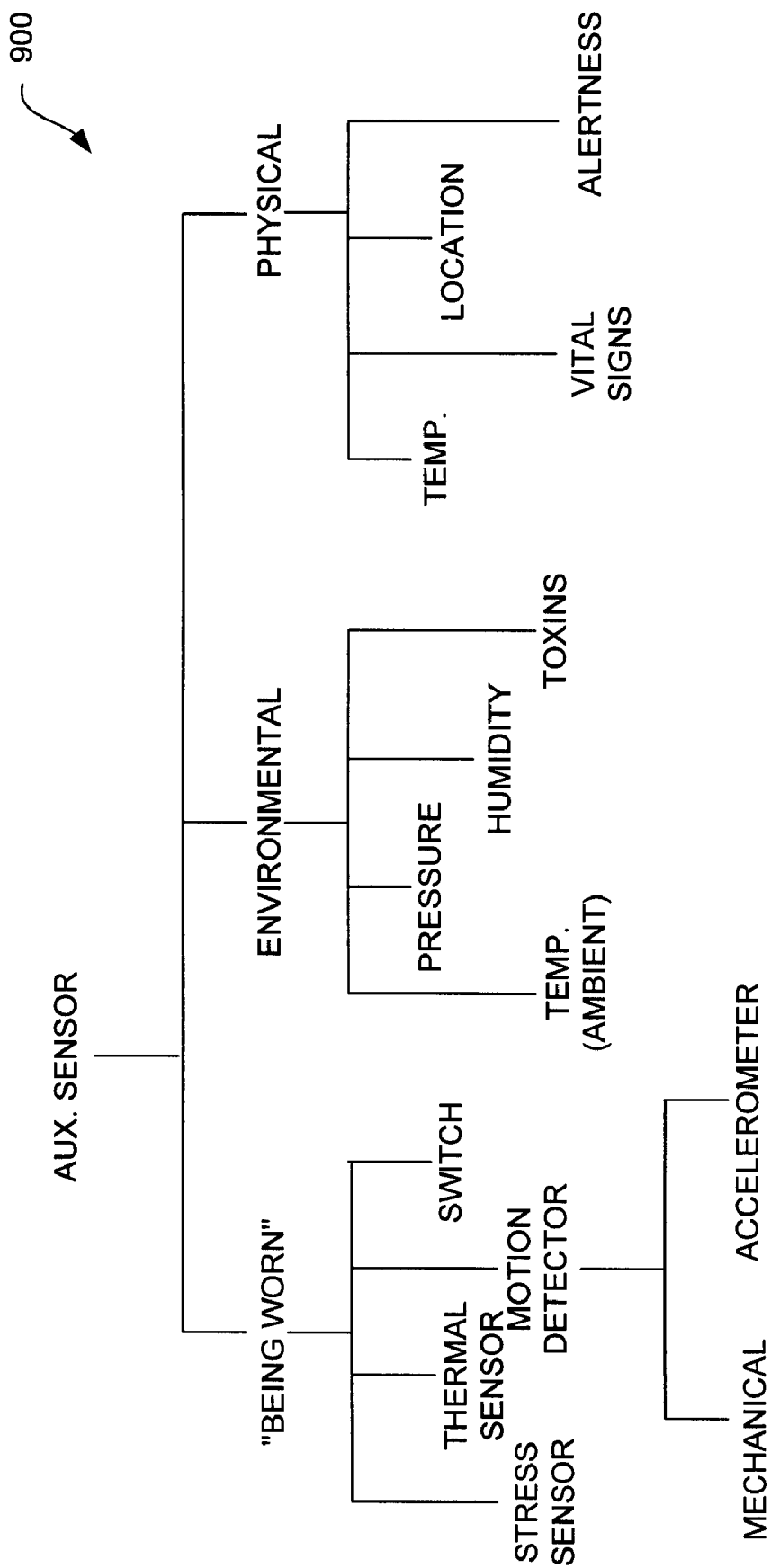
FIG. 9 is a chart that depicts examples of auxiliary sensors that can be utilized with the eyewear.

In one embodiment, the eyewear including the activity monitoring system can further include one or more auxiliary sensors. FIG. 9 is a chart 900 that depicts examples of auxiliary sensors that can be utilized with the eyewear.

The chart 900 indicates that one type of auxiliary sensor is a "being worn" sensor. The "being worn" sensor would indicate whether the glasses are being worn by its user. The "being worn" sensing mechanism can be performed using, for example, a thermal sensor, a motion detector, a stress sensor or a switch.

In one embodiment, a motion detector is used as a "being worn" sensor. A threshold can be set, such that if the amount of motion detected exceeds the threshold, the eyewear is assumed to be worn. The motion detector can, for example, be achieved by a mechanical means or an accelerometer.

In another embodiment, the "being worn" sensor includes one or more thermal sensors. In the case where two sensors are used, one sensor can be at approximately the middle of a temple, such as in a region that would receive heat from the head of the user wearing the glasses, and the other sensor can be positioned at the end of the same temple close to the hinge. If the temperature differential between the two sensors is beyond a certain preset value, the eyewear would be assumed to be worn.

In yet another embodiment, the "being worn" sensor includes a stress sensor at the hinge of the temple. The assumption is that when the eyewear is worn, the hinge is typically slightly stretched because typically the width of the head of the user can be slightly wider than the width between the temples when the two temples are in the extended positions. If the value of the stress sensor is beyond a certain preset value, the glasses would be assumed to be worn.

In still yet another embodiment, the "being worn" sensor can be implemented as a switch. For example, the switch can utilize optical, magnetic or mechanical means. In one embodiment, the switch can be positioned at the temple of the eyewear, such as a forward end of the temple proximate to a corresponding lens holder. Different embodiments of such sensors is also described in U.S. Provisional Patent Application No. 60/583,169, filed Jun. 26, 2004, entitled "ELECTRICAL COMPONENTS FOR USE WITH EYEWEAR, AND METHODS THEREFOR," which has been incorporated herein by reference, see, e.g., section entitled "EYEGLASSES WITH USER INPUT CAPABILITY."

Another type of auxiliary sensor is an environmental sensor. The environmental sensor can sense environmental conditions, such as one or more of temperature (e.g., ambient temperature), pressure, humidity and toxins (e.g., chemicals, radiation, etc.).

Still another type of auxiliary sensor is a physical sensor. The physical sensor can sense physical conditions of the user of the glasses. Examples of physical sensors include sensing one or more of location, temperature, alertness, and vital signs (e.g., heart rate, blood pressure, breathing rate, etc.) associated with the user of the glasses. Still other physical sensors can sense emotions of the user. For example, the physical sensor could sense whether the user is calm, excited, happy, sad, angry, etc. In one embodiment, the physical sensor can also more generally sense user activity level. As an example, the user activity level can be used to provide a lifestyle indication. For example, a lifestyle indication might show that the user was active today or, alternatively, lazy today. Such a lifestyle indication can be displayed as a text or graphic symbol to let the user or others aware of the activity level.

In one embodiment, one particular type of physical sensor is a heart-beat sensor. The heart-beat sensor measures the heart beat of the wearer of the eyewear. One implementation for the heart-beat sensor utilizes an infrared emitter and an infrared detector as components. The infrared emitter can be an infrared LED and the infrared detector can be an infrared photodiode (or a non-infrared photodiode with a separate infrared filter). The components can be located on a frame (e.g. temple or nose-pad) of the eyewear, with both the emitter and the detector facing the user when the eyewear is worn. In operation, the infrared emitter shines infrared radiation towards the user, and the detector captures the infrared signals reflected back by the skin of the user. The magnitude of the reflected signals depends on the amount of blood flowing below the skin, which, in turn, depends on (i.e., fluctuates with) the heart beat. The rate of emission by the emitter and reception by the detector can be modulated (e.g., amplitude modulate) in a frequency range much higher than the heart beat, such as three Kilohertz. And the signals from the detector can be low-pass filtered before they are measured to identify the heart beat of the user. For example, the low-pass filter can a cutoff frequency at about 1 Hertz (Hz). Alternatively, some or all of the components can be tethered to the frame of the eyewear in a manner described in U.S. patent application Ser. No. 10/964,011, which is incorporated herein by reference. Further details on heart-beat sensors or heart-beat monitoring are contained in (i) U.S. Provisional Patent Application No. 60/647,836, filed Jan. 31, 2005, and entitled "EYEGLASSES WITH HEART RATE MONITOR;" and (ii) U.S. Provisional Patent Application No. 60/787,850, filed Apr. 1, 2006, and entitled "EYEGLASSES WITH A HEART RATE MONITOR," both of which are hereby incorporated herein by reference.

In one embodiment, there could be an output device to provide outputs to the user, such as regarding her heart rate and/or other monitored information. For example, the output device could be based on audio or visual capabilities or both. In one embodiment with visual outputs, the output device could be located at the inside, peripheral position of the glasses, such as a forward, inner area of a temple close to a hinge that couples a temple to a lens holder. Such an output device can also provide status information to the user, such as battery condition, on/off, communicating, etc.

In another embodiment, there could be a wireless transceiver in the glasses to send signals regarding the monitored heart rate and/or other monitored information and/or status information to a portable or handheld device carried by the user for additional processing and/or display. In still another embodiment, the glasses can further include a memory device storing, for example, data from any of the sensors (monitored data), status data, song data, file data, etc. The memory device could be integral with or attachable to the glasses. One example of an attachable memory is a memory card.

It should be understood that the sensors might rely on more than one measured criteria. The one or more measured criteria might be used to determine the sensor output. The determination of the sensor output can involve estimation or prediction.

The auxiliary sensors can be provided in a redundant or fault-tolerant manner. For example, sensors can be provided in pairs. When one sensor of a pair malfunctions, the other one can replace it. In another embodiment, any of the auxiliary sensor information can be processed in a differential manner to examine changes to the auxiliary sensor information. The auxiliary sensors can by powered by a battery, solar energy, or kinetic energy. For reduced power consumption, the auxiliary sensors can remain in a low-power state unless data is being acquired by the auxiliary sensors. In yet another embodiment, two or more of the auxiliary sensors can communicate with one another (wired or wirelessly) to exchange data or control information.

In general, the auxiliary sensors can be fully or partially embedded in the eyewear or a base tethered to the eyewear. Alternatively, one or more of the auxiliary sensors can be separate from the eyewear, or any base tethered thereto, and wirelessly communicate with the eyewear or base.

An output (e.g., notification to the user) can vary in content and type. The type can be visual and/or audio. The content can be numerical, graphical, musical, textual, synthesized text, etc. The output can also be predetermined, dynamically determined or configurable. Still further, the output can be dependent on user preferences, user physical characteristics, auxiliary sensor information (e.g., location), or degree of health risk.

An activity monitoring system can also include one or more connectors with the eyewear. The connectors can, for example, facilitate electrical or mechanical interconnection with an external electrical device (e.g., computing device, media player, headset, power source). Although the format and size of the connectors can vary, in one embodiment, the connector is a standard audio connector or a peripheral bus connector (e.g., USB connector).

An activity monitoring system can also include one or more switches with the eyewear. The switches can, for example, facilitate user input or control with respect to the activity monitoring system. For example, the switches can provide one or more of on/off, reset, on, on (and reset), and calibration. The activity monitoring system can also provide a user with an indication of whether the system is currently on or off, such as by a graphical image on a display device or by a LED.

An activity monitoring system can also include a memory. The memory can be volatile or non-volatile. The memory can also be removable or non-removable with respect to the eyewear. If the memory is volatile, the activity monitoring system, if solar powered, could also include a battery to provide power to the memory so that stored data (e.g., user preferences, etc.) can be retained even when adequate solar energy is not available. As an example, the presence of a memory can allow storage of activity information for an extended period of time to acquire a historical understanding of activity information.

In one embodiment, an eyeglass frame can include memory that can store acquired activity information. Such stored activity information can be subsequently uploaded to a computer, in a wired or wireless manner. The activity information can then be analyzed by the computer.

An activity monitoring system can also include a communication module. The communication module would allow data transmission to and from the activity monitoring system (namely, the eyewear) and an external device. The data being transmitted can, for example, be activity information, configuration data, user preferences, or auxiliary sensor data. The data transmission can be wireless or wireline based. The eyewear can further include a connector operatively connected to the activity monitoring system. Such a connector can facilitate data transmission with respect to the activity monitoring system or the eyewear.

A temple of a pair of glasses can be removable from the remainder of the frame. Such facilitates replacement of temples. For example, a convention temple could be removed from a frame and replaced with a temple having at least one electrical component at least partially embedded therein.

An activity monitoring system can be partially or fully contained in a temple arrangement associated with a temple of a pair of glasses. In one embodiment, the temple arrangement can be removable from the temple. A temple arrangement can be a temple tip, a temple cover or a temple fit-over.

In one implementation, an activity monitoring system (e.g., pedometer) can alternatively be provided in a temple arrangement. Referring back to FIG. 1, each temple 108, 110 has two ends, the first end and the second end. The first end is the end that is pivotally secured to its corresponding hinge 112, 114. In one arrangement, the second end of one or both of the temples 108, 110 has a temple arrangement. In one embodiment, at least a portion of the electrical components of an activity monitoring system (e.g., pedometer) is in a temple arrangement, and another portion of the electrical components of the activity monitoring system is in a temple arrangement.

For some glasses, particularly when a pair of glasses has not been extensively worn, a temple arrangement, such as a temple tip, can be relatively easily removed and re-inserted into the glasses. As a result, temple arrangements of different color and/or shape and/or having different electrical components can be applied to the same frame of a pair of glasses. Retailers or distributors can then provide after-market modification or enhancement to a pair of glasses, at the preference of their consumers. This, for example, can be done by replacing existing temple tips with replacement temple tips. Alternatively, a consumer can identify the preferred temple arrangements to be sold with the glasses. Different embodiments on after-market enhancement and/or modification of glasses have previously been described in the related patent applications mentioned above.

An activity monitoring system can be partially or fully tethered to a pair of glasses. For example, some of the components for monitoring activity or one or more auxiliary sensors can be tethered to the eyewear. In one embodiment, the tethered components can be tethered at the neck or upper back region of the user. Tethering components can allow for increased design freedom with the eyewear as well as additional area with which to house the components. For example, an activity monitoring system could be partially or completely within a device or a base that can be tethered to eyewear.

Still further, an activity monitoring system could be partially or completely within a device or a base that can be tethered to eyewear.

In another embodiment, an eyeglass frame can have openings (e.g., holes) at the ends of the temple tips so as to facilitate attachments of straps, holders, etc.

Although much of the above discussion pertains to providing activity monitoring capabilities in eyewear, it should be understood that any of the various embodiment, implementations, features or aspects noted above can also be utilized in other or on end products besides eyewear. Examples of other such end-products can include: hats (e.g., soft hats, hard-hats, helmets), watches or watch bands, bracelets, bracelet accessories, necklaces, necklace accessories, rings, shoes (e.g., sandals, athletic shoes, beach shoes), shoe accessories, clothing (e.g., tee-shirt, swimming-suit, ties, pants, jackets, etc.), belts, belt accessories, zippers, key rings, purses, beach-tags, containers (e.g., cups, bottle, tube—such as a sun tan lotion bottle or tube); container holders (e.g., can holders, coasters, coolers, etc.), and other consumer products.

A number of embodiments have been described above for an eyeglass frame, i.e., primary frame. Such embodiments are also applicable to an auxiliary frame. An auxiliary frame can attach to a primary frame through different techniques, such as using clips or magnets.

In the event that electrical components, such as an activity monitoring system, are at least partially embedded in one of the temples of an eyeglass frame, the other of the temples can include other electrical components or even a counter weight. It is desirable for the eyeglass frame to be substantially balanced. Hence, the implementation of the eyeglass frame should offset any weight imposed by activity or other monitoring. For example, if five (5) grams of electrical components are added to one temple, the other temple should also have approximately five (5) grams added thereto.

This application references each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011 (now U.S. Pat. No. 7,192,136), filed Oct. 12, 2004, and entitled "TETHERED ELECTRICAL COMPONENTS FOR EYEGLASSES," which is hereby incorporated herein by reference; (iii) U.S. patent application Ser. No. 11/006,343 (now U.S. Pat. No. 7,116,976), filed Dec. 7, 2004, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269, filed Jul. 15, 2005, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,256, filed Jul. 15, 2005, and entitled "EYEGLASSES WITH ELECTRICAL COMPONENTS," which is hereby incorporated herein by reference; (x) U.S. patent application Ser. No. 11/183,263, filed Jul. 15, 2005, and entitled "EYEGLASSES WITH A CLOCK OR OTHER ELECTRICAL COMPONENT," which is hereby incorporated herein by reference; (xi) U.S. patent application Ser. No. 11/700,550, filed Jan. 30, 2007, and entitled "HAT WITH A RADIATION SENSOR," which is hereby incorporated herein by reference. (xii) U.S. patent application Ser. No. 11/650,626, filed Jan. 6, 2007, and entitled "EYEGLASSES WITH A HEART RATE MONITOR," which is hereby incorporated herein by reference. (xiii) U.S. patent application Ser. No. 11/521,256, filed Sep. 13, 2006, and entitled "TETHERED ELECTRICAL COMPONENTS FOR EYEGLASSES," which is hereby incorporated herein by reference; (xiv) U.S. patent application Ser. No. 11/580,222, filed Oct. 11, 2006, and entitled "EYEWEAR SUPPORTING AFTER-MARKET ELECTRICAL COMPONENTS," which is hereby incorporated herein by reference; and (xv) U.S. patent application Ser. No. 11/546,685, filed Oct. 11, 2006, and entitled "EYEGLASSES WITH ELECTRICAL COMPONENTS," which is hereby incorporated herein by reference.

The present application also references each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (vii) U.S. Provisional Patent Application No. 60/725,999, filed Oct. 11, 2005, and entitled "EYEWEAR SUPPORTING AFTER-MARKET ELECTRICAL COMPONENTS," which is hereby incorporated herein by reference; (viii) U.S. Provisional Patent Application No. 60/725,896, filed Oct. 11, 2005, and entitled "EYEGLASSES WITH ELECTRICAL COMPONENTS," which is hereby incorporated herein by reference; (ix) U.S. Provisional Patent Application No. 60/647,836, filed Jan. 31, 2005, and entitled "EYEGLASSES WITH HEART RATE MONITOR;" (x) U.S. Provisional Patent Application No. 60/787,850, filed Apr. 1, 2006, and entitled "EYEGLASSES WITH A HEART RATE MONITOR," which is hereby incorporated herein by reference; (xi) U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES," which is hereby incorporated herein by reference; (xii) U.S. Provisional Patent Application No. 60/647,826, filed Jan. 31, 2005, and entitled "EYEGLASSES WITH ELECTRICAL COMPONENTS," which is hereby incorporated herein by reference; and (xiii) U.S. Provisional Patent Application No. 60/763,854, filed Jan. 30, 2006, and entitled "HAT WITH A RADIATION SENSOR," which is hereby incorporated herein by reference.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Certain aspects of the invention can be implemented in software, hardware or a combination of hardware and software. Certain aspects of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that a pedometer or other activity monitor can be added to or coupled to eyewear. Another advantage of the invention is that pedometer or other activity monitoring capabilities can be provided for eyeglasses without substantial interference to style or design choices, and thus without being apparent that the eyeglasses support such capabilities.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A pair of glasses comprising:

a first lens holder having a first side and a second side;

a second lens holder having a first side and a second side;

a bridge element coupling the second side of the first lens holder to the first side of the second lens holder;

a first temple coupled to the first side of the first lens holder;

a second temple coupled to the second side of the second lens holder; and a pedometer system at least partially embedded in said glasses, said pedometer system including at least:

a movable structure that moves in association with user movement, wherein during operation the movable structure moves causing the movable structure to be in electrical contact with a conductive surface, the conductive surface being in physical contact with an acoustic dampening material at least while the movable structure is in electrical contact with the conductive surface; and electrical circuitry for producing movement data that corresponds to user movement based on the movement of the movable structure, and for producing pedometer information from the movement data.

2. A pair of glasses as recited in claim 1, wherein said pedometer system comprises a display for displaying at least the pedometer information.

3. A pair of glasses as recited in claim 1, wherein the pedometer system comprises a switch, which can be used to activate the pedometer system.

4. A pair of glasses as recited in claim 1, wherein the pedometer system further comprises a battery to power the pedometer system.

5. A pair of glasses as recited in claim 1, wherein the pedometer system is at least substantially embedded in said first temple.

6. A pair of glasses as recited in claim 1, wherein the acoustic dampening material is interposed between the movable structure and the conductive surface.

7. A pair of glasses as recited in claim 1, wherein the acoustic dampening material is provided on or below the conductive surface.

8. A pair of glasses as recited in claim 1, wherein the acoustic dampening material is conductive.

9. A pair of glasses as recited in claim 1, wherein said pedometer system further comprises a conductive auxiliary arm coupled to the movable structure, wherein the movable structure makes electrical contact with the conductive surface via the conductive auxiliary arm.

10. A pair of glasses as recited in claim 1, wherein the acoustic dampening material is provided as a layer on the conductive surface.

11. A pair of glasses as recited in claim 1, wherein the movable structure has a weight and the acoustic dampening material is provided on at least a portion of the weight.

12. A pair of glasses as recited in claim 11, wherein the acoustic dampening material is provided around the weight.

13. A pair of glasses as recited in claim 1, wherein the pedometer system further comprises a pedometer housing that houses at least the movable structure, the electrical circuitry, a display and a battery.

14. A pair of glasses as recited in claim 13,
wherein the conductive surface is metallic and is internal to the pedometer housing, and
wherein the conductive surface is part of the battery.

15. A pair of glasses comprising:
a frame having at least a bridge and a pair of temples; and
an activity monitor at least partially embedded in the frame and operable to measure activity associated with a user of the pair of glasses,
wherein said activity monitor includes a pendulum that is used in measuring the activity associated with the user, the pendulum moves in accordance with the activity associated with the user, and
wherein said activity monitor further includes means for acoustically dampening noise induced by movement of the pendulum.

16. A pair of glasses as recited in claim 15, wherein said activity monitor is embedded in at least one of the temples.

17. A pair of glasses as recited in claim 15, wherein the pair of glasses further comprises a display for displaying information on the inside of one of the temples.

18. A pair of glasses as recited in claim 17, wherein the information being displayed on the display pertains to an activity level.

19. A pair of glasses as recited in claim 17, wherein the information being displayed on the display pertains to a distance traveled, step count or calorie count.

20. A method for operating a pedometer in a pair of glasses, comprising:
receiving a count signal;
determining whether the count signal is reliable;
ignoring the count signal when said determining determines that the count signal is not reliable;
incrementing a total count when said determining determines that the count signal is reliable; and
outputting the total count or a value derived therefrom.

* * * * *